United States Patent [19]

Brifman et al.

[11] Patent Number: 4,556,882
[45] Date of Patent: Dec. 3, 1985

[54] REMOTE CONTROL CIRCUIT BREAKER SYSTEM WITH ON-OFF-TRIPPED-PROBLEM STATUS STORAGE AND INDICATION

[75] Inventors: Josef Brifman, Haifa, Israel; M. Frank Chacon, Elkmont, Ala.; Richard F. Schmerda, Oak Creek; Frank E. Smith, Oconomowoc, both of Wis.

[73] Assignee: Eaton Corporation, Cleveland, Ohio

[21] Appl. No.: 441,973

[22] Filed: Nov. 15, 1982

[51] Int. Cl.$^4$ ............................................. H04Q 9/00
[52] U.S. Cl. .............................. 340/825.06; 340/638; 340/825.16
[58] Field of Search ...................... 340/825.06, 825.07, 340/825.16, 825.17, 825.37, 639, 638, 825.18

[56] References Cited

U.S. PATENT DOCUMENTS

| | | | |
|---|---|---|---|
| 3,444,521 | 5/1969 | Breese | 340/825.37 |
| 3,452,329 | 6/1969 | Pepin | 340/825.37 |
| 3,493,930 | 2/1970 | Stoffels et al. | 340/163 |
| 3,529,292 | 9/1970 | Neill et al. | 340/825.16 |
| 3,689,887 | 9/1972 | LaFalce et al. | 340/163 |
| 3,708,784 | 1/1973 | Spencer | 340/147 R |
| 3,828,313 | 8/1974 | Schull et al. | 340/147 SY |
| 3,832,688 | 8/1974 | Strojny et al. | 340/147 R |
| 3,842,249 | 10/1974 | Geyer et al. | 235/151.21 |
| 3,882,465 | 5/1975 | Cook et al. | 340/147 R |
| 4,015,206 | 3/1977 | Huntley | 340/825.16 |
| 4,086,568 | 4/1978 | Watts, Jr. et al. | 340/825.36 |
| 4,106,013 | 8/1978 | Cronin | 340/27 R |
| 4,143,410 | 3/1979 | Cronin | 361/93 |
| 4,146,884 | 3/1979 | Kurn | 340/518 |
| 4,206,443 | 6/1980 | Britton | 340/147 R |
| 4,263,580 | 4/1981 | Sato | 340/163 |

OTHER PUBLICATIONS

Automatic Control of Aircraft Electrical System Reduces Wiring and Improves Reliability, Westinghouse Engineer, Jul., 1971.

Primary Examiner—Donald J. Yusko
Attorney, Agent, or Firm—C. H. Grace; W. A. Autio

[57] ABSTRACT

A remote control circuit breaker and contactor system having at least one I/O circuit functioning as an interface between a central processing unit and a plurality of up to 32 devices such as remote circuit breakers for each I/O circuit, each remote circuit breaker having an individual electronic circuit which receives commands from the I/O circuit to turn the breaker or contactor on or off or hold and also senses the state of the breaker contacts and the control line and upon request sends back status codes which are stored in the memory in the I/O circuit to be read when desired by the central processing unit. Four-state status information is provided including open, closed, tripped and problem (low voltage, open or shorted control line). Contact state is determined by directly measuring the contact resistance in single break contacts (or solid state device contactors) or the contact voltage in double-break contacts. The I/O circuit provides noise rejection using measured noise as a threshold to minimize the effect of electrical noise on the status communication signals coming from the remote breaker electronic circuit. In the event electrical noise on the control line or the like causes rapid turn-on and turn-off of the remote breaker, a rapid cycle inhibit circuit for a timed interval stops such cycling of the remote breaker after a predetermined number thereof to prevent damage to the remote device due to overheating. The remote breaker electronic circuit affords manual control of the breakers or contactors and trip indication of the breakers in addition to computer control through the I/O circuit. The system uses tristate communication circuitry which includes a hold command and prevents unwanted state changes during losses of power or when a control line shorts to ground or opens.

31 Claims, 19 Drawing Figures

REMOTE CONTROL CIRCUIT BREAKER SYSTEM WITH ON-OFF-TRIPPED-PROBLEM STATUS STORAGE AND INDICATION

BACKGROUND OF THE INVENTION

Circuit breaker devices have been known heretofore and have been used as circuit protective devices in aircraft and the like because of their resettability. Unlike fuses which are destroyed on an overload and which have to be replaced, circuit breakers which trip in response to an overload can be used to reclose the protected circuit once the overload condition no longer exists. Another advantage over fuses is that aircraft circuit breakers of the remote control type are equipped with manual actuation and indication capability which indicates the open/close command sent to the remotely located breaker device by the position of the indicator control unit (I/CU) operating lever, which indicator control unit is located in the cockpit or flight deck of the aircraft. In a crowded flight deck where circuit breakers are found by the hundreds, it is often very difficult to locate each device and to control it manually. Of course, it is practically impossible to visually monitor all the indicator levers and to be able to locate an overload trip the moment it occurs. This task is more suitable for microprocessors than for human beings. The microprocessors can rapidly scan all of the circuit breakers and compare their states to the commands in memory and initiate a warning and identification display when they differ. Instead of a huge switch board, a small key board and display unit could be used.

The electronic circuits of prior remote control circuit breakers (RCCB's) were very limited in their capabilities. The disadvantages inherent therein included at least the following. They were not intended or suited for computerized control. Entirely different operating circuits were required for single phase and three-phase devices. The single-phase devices involved the mechanical complexity of cutthroat contacts. They were subject to rapid cycling damage. They had limited noise immunity. Since they did not utilize three state signalling, they were subject to possible operating state ambiguity due to low voltage, welded contacts, false trip, etc. The three-phase device was subject to unnecessary coil current pulse during power-up. While the coil pulse durations were timed, such timing was not a function of contact transfer in the three-phase devices. And they involved the mechanical complexity of overload trip switch and linkage.

SUMMARY OF THE INVENTION

An object of the invention is to provide an improved remote control circuit breaker system.

A more specific object of the invention is to provide an improved input/output (I/O) circuit common to a multiplicity of remotely located circuit breakers and being capable of receiving open/close commands from a central processing unit and for repeatedly sending such commands to the remote circuit breakers in order to set the states thereof.

Another specific object of the invention is to provide such I/O circuit with improved means for periodically interrogating each remote circuit breaker serviced thereby as to its closed, opened, tripped or problem state and for storing data with respect to the same in a memory for transmission upon request to a central processing unit.

Another specific object of the invention is to provide such I/O circuit with improved noise rejection means which superimposes the state signal above a measured noise level.

Another specific object of the invention is to provide each remotely-located circuit breaker with a unitized control electronic circuit having improved contact state sensing means capable of sensing the resistance of single break contacts or solid state device contactors or the voltage across double-break contacts thereby affording interchangeability of line and load terminals.

Another specific object of the invention is to provide such circuit breaker unitized control electronic circuit with improved means for sensing and transmitting 4-state status information periodically including open, close, trip and problem status information.

Another specific object of the invention is to provide such circuit breaker unitized control electronic circuit with improved means affording rapid cycle protection.

Another specific object of the invention is to provide such circuit breaker unitized control electronic circuit with improved means affording manual control as well as automatic (computer) control through the I/O circuit of the remote circuit breaker devices.

Another specific object of the invention is to provide the remote control circuit breaker system with improved means affording tri-state communication so as to prevent undesirable state changes in the event of power loss or control line short to ground or open conditions.

Another specific object of the invention is to provide such circuit breaker unitized control electronic circuit with improved means for limiting the circuit breaker coil operating pulse to a length having sufficient energy to operate the contacts rather than a standard length and for terminating the pulse when the contacts operate thereby to avoid the necessity of mechanical cutthroat contacts.

Other objects and advantages of the invention will hereinafter appear.

Additional features of the invention include:

Compatibility with computer control and indicator/-control unit (I/CU) control.

Definite state sensing in that the contact position is sensed electronically by sensing resistance or voltage.

Interchangeability of remote device line and load terminals make it especially suitable for bus tie applications.

Frequent updating of command and status avoid ambiguous states..

It doesn't require any mechanical cutthroat contacts, overload trip switches, or other auxiliary contacts.

The system is common to and needs no modification for single-phase or three-phase devices or any other remote control devices.

Coil current is applied only when a change of state is required, even during power-up.

If the voltage is too low to effect contact transfer, the system will indicate it and on restoration of full voltage, frequent updating will afford correct states. Under manual control, the remote circuit will try to correct incorrect states every 3 seconds.

Control line fault to ground or open will not cause state changes due to tri-state communication.

BRIEF DESCRIPTION OF THE DRAWINGS

FIGS. 4a-e show a logic diagram of the circuit shown as a rectangle in FIG. 3.

DESCRIPTION OF THE PREFERRED EMBODIMENT

Figure 1:
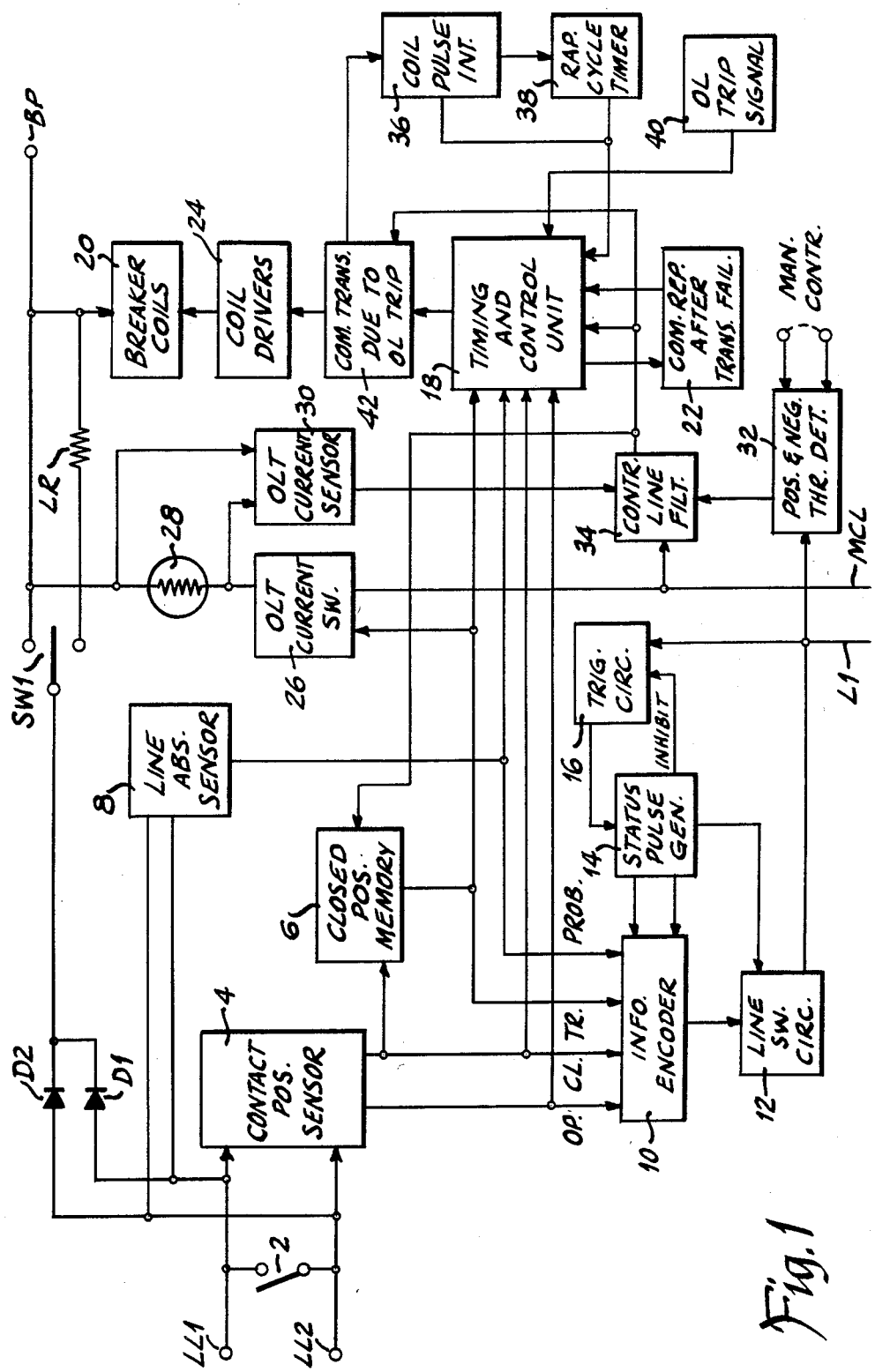
FIG. 1 is a block diagram of a remotely located circuit breaker and its unitized electronic control circuit individual thereto.
Figure 2:
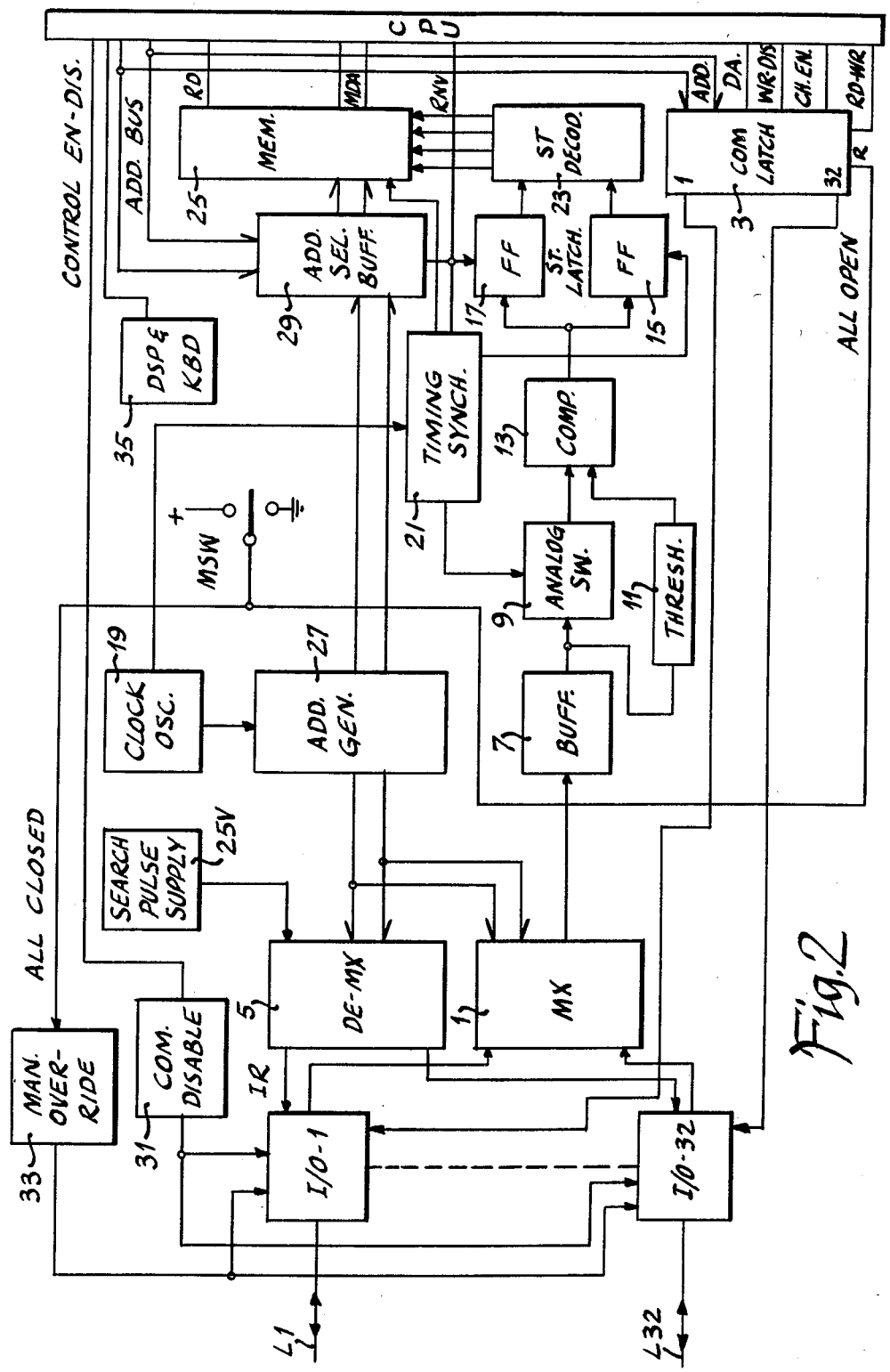
FIG. 2 is a block diagram of an I/O circuit common to and connected at its left hand side to a plurality, such as 32, remote circuit breaker electronic circuits and being in communication with a central processing unit shown at its right hand side.

Referring to FIGS. 1 and 2, there is shown in block diagram form the entire remote control circuit breaker system. FIG. 1 shows the unitized electronic control circuit that is incorporated in each circuit breaker at the remote location. FIG. 2 shows a local I/O logic circuit that is common to a plurality, such as 32, of the FIG. 1 circuits. This I/O circuit in FIG. 2 is capable of controlling, and receiving information from, up to 32 breaker devices in response to a command or information request from a central processing unit CPU shown schematically at the extreme right hand portion of FIG. 2. While only one breaker electronic circuit has been shown in FIG. 1, it will be apparent that 31 additional similar circuits as shown in FIG. 1 can be connected to the lines at the left hand portion of FIG. 2; thus, one I/O circuit controls 32 remote breakers. While only one I/O circuit has been shown in FIG. 2, it will be apparent that the central processing unit CPU shown at the right hand portion of FIG. 2 can control additional like I/O circuits. In this manner, the number of breaker devices that can be controlled can be increased by controlling more I/O circuits from one central processing unit. The connection between the I/O circuit and each of the remote circuit breaker electronic circuits is through one active line and one common return line (ground) as more clearly shown in FIGS. 3a and 5a. Thus, line L1 at the left hand portion of FIG. 2 connects to line L1 at the lower portion of FIG. 1. In a similar manner, each of the other lines L2-L32 at the left hand portion of FIG. 2 connect to 31 similar circuits as that shown in FIG. 1. This single line pair L1 conveys open and close commands from the I/O circuit (where they are latched by the CPU) to the remote breaker electronic circuit and also periodically returns four different types of information, namely, open, closed, tripped, and problem indication, all of which are stored in a memory in the I/O circuit to become available at any time to the central processing unit CPU. Another input which is a manual control line MCL shown at the lower portion of FIG. 1 is provided to allow alternative manual control of the remote circuit breaker or other remote control device by means of an indicator control unit I/CU shown in FIG. 3a and also to return to the indicator control unit I/CU a trip indication command in the event that the circuit breaker should trip under overload conditions.

As shown at the upper left hand portion of FIG. 1, the remote circuit breaker is represented by a pair of contacts 2 of the single break type connected across a pair of lines LL1 and LL2 which may be connected to the line side and the load side, respectively, of a power circuit or vice versa. While single break contacts 2 are shown in this block diagram for illustrative purposes, it will become apparent as the description proceeds that the system will operate as well with double break contacts 2' which are illustrated and described in connection with FIG. 3a. A contact position sensor 4 which is connected across contacts 2 can distinguish between the open or closed state of the contacts by detecting the resistance across them or the voltages at the outer and center contacts of double break contacts. A closed position memory 6 is connected to sensor 4 and is set when the contacts are closed and can be reset only if the contacts are open while the open command exists.

Three types of contact state information can be received from those circuits, namely, contacts closed, contacts open and tripped condition. The contacts open data is received when the contacts open and the memory resets. The tripped condition data is received when the contacts are open after they were closed without an open command having been applied or when an external current sensing overload signal is applied. A fourth type of information called the problem state is also received. This comes about when there is no line voltage on the contacts in which event the line absence sensor 8 senses it and indicates the problem situation. As shown in FIG. 1, this line absence sensor is also connected to lines LL1 and LL2 which are connected to contacts 2. Also, when the control line L1 to the I/O is open or shorted, a problem state is indicated.

Those four information signals, that is, the open, closed, tripped and no line voltage signals, are transferred to information encoder 10 and are then sent to the line switching circuit 12 at the proper time as determined by timing signals P1, P2 and P3 of status pulse generator circuit 14. Periodic operation of this status pulse generator 14 is initiated by a triggering circuit 16 in response to a search pulse coming along line L1 from the I/O circuit hereinafter described. Once the status pulse generator 14 is triggered into operation, an inhibit signal is applied to triggering circuit 16 to prevent a repeated triggering of the status pulse generator for a suitable time interval. The same contact status and line status information that is applied to information encoder 10 is also applied to timing and control circuit 18 where it is utilized to terminate the coil pulses when the remote breaker contact transfer has taken place.

Timing and control unit 18 sends the proper pulses to operate the coils 20. For this purpose, a pulse is distributed to the proper coil according to the command on the manual control line MCL or on the I/O circuit control and information line L1. The length of the coil operating pulse is limited to the length which has sufficient energy to transfer the remote breaker contacts. When the contact transfer is completed, the pulse is stopped. It will be apparent that this is an electronic substitute for mechanical cutthroat contacts such as are used in prior single-phase remote control circuit breakers. If the power contacts do not transfer or there is no line voltage, the contact transfer will not be sensed. In such case, the coil pulse will be limited to a pulse width which is sufficient to transfer in the worst case condition when the device again becomes operational and is dependent on the line voltage such that there will be a shorter pulse width for higher voltage and vice versa. This feature reduces the power required to operate the remote breaker devices on 115 volt AC, 400 Hz.

If for some reason, such as generally when the line voltage is too low, the remote breaker contacts do not transfer immediately after a commanded change, a "command repetition after transfer failure" circuit 22 will command it approximately every three seconds or the like. These commands will continue until the contact transfer is effected as sensed by the contact position circuit 4. The pulses operate coil drivers 24 in the form of power FET's that drive coils 20. The current in the coils and FET's is limited when the power circuit LL1-LL2 is connected to 115 volts AC by a limiting resistor LR which is connected in or bypassed by an external connector or switch SW1 depending upon the magnitude of the voltage used in the system. For example, if the voltage used in the system is 105-125 volts AC, resistor LR is connected in the circuit. Rectifier diodes D1 and D2 connected to lines LL1 and LL2 provide DC power for operation of the coils when the system power is AC. On the other hand, when the system power is, for example, 18-32 volts DC, switch SW1 is set to bypass resistor LR. DC backup power may be provided at terminal BP in the event the main power of the system should fail.

The overload current trip switch 26 is a FET switch instead of a mechanical switch which has been used on prior devices. This switch is used only when the remote breaker electronic circuit includes a manual indicator control unit IC/U and drives current into the overload trip, current limit, positive temperature coefficient thermistor 28 to drive the indicator control unit off. The overload trip current sensor 30 is a trip hold-off device which prevents the open command from occurring before the indicator control unit I/CU circuit breaker switch has opened. This is important to provide positive status information about the breaker device even if the voltage on the control line becomes high because of the IR drop caused by a high current through the resistance of the indicator control unit and its manual control line MCL.

The control from the I/O circuit comes through line L1. This line is connected to the positive and negative threshold detector 32. When the command is "open", the I/O circuit sends a positive DC level to the line and, when the command is "close", the I/O circuit sends a negative DC level signal. When the command is "hold", the I/O circuit sends a ground level, approximately 0 V., signal. These signals enable tri-state operation of the device. If the line breaks or shorts to ground, the device will stay in its last position (hold). These two threshold levels increase the noise immunity. The noise level tolerated by this system can be double the peak-to-peak amplitude tolerated by prior art devices.

Control line filters 34 reject noise of 50 Hz frequency and greater. However, lower frequencies cannot be filtered because such a filter would inhibit the fast response to the control command. Continuous noise in the range of 1-50 Hz which drives continuous energy into the coils and into the switching components could cause rapid operations of the breaker device were it not for protective means. The breaker control electronic circuit has circuitry to protect itself and the device from this rapid cycling without losing the fast transfer response. This circuit includes a coil pulse integration circuit 36 and a three second rapid cycle timer 38. If there are a number of pulses to the coil during a several second period, the three second timer inhibits additional pulses to the coils for three seconds. Therefore, when it is needed, the device has a fast response to a number of operations, but if the operations cycle is continuous, the circuit limits the duty cycle to one or two operations every three seconds, a rate that is not harmful to the coils and does not exceed the specifications of the maximum operation rate.

An overload trip signal circuit 40 receives a signal from a current sensor and operates through timing and control unit 18 to activate a command-transfer-due-to-overload-trip, circuit 42, to command opening of the remote circuit breaker.

Referring to FIG. 2, the I/O circuit shown in block diagram form therein is common to a plurality of remote circuit breaker electronic circuits of the FIG. 1 type and connects to up to 32 thereof through lines L1-L32 shown at the left hand portion thereof. This I/O circuit controls and gets information from up to 32 remote control circuit breakers and stores the breaker state information in a memory for delivery to a central processing unit shown schematically at the right hand portion of FIG. 2. The remote control circuit breaker controls or commands are transmitted by the central processing unit to this I/O circuit and are distributed thereby to the plurality of lines and therethrough to the respective remote control circuit breakers in order to set the latter in the desired on-off states. For each control line L1-L32, there is a unit I/O sub-circuit such as I/O-1 through I/O-32, respectively, which drives the line with the different on-off command signals and transfers the status information to the multiplexers 1. The signals that are transmitted by the I/O system over the lines, such as line L1, are the open and close commands sent from command latches 3 through the I/O sub-circuits to the lines as well as short command-interruption pulses for information requests that come from the 25 V search pulse supply through demultiplexer 5. During the searching or information request pulse IR, the remote breaker electronic circuit of FIG. 1 replies by sending the contacts state indication in internally coded format hereinafter described. This reply comes through multiplexer 1 and is detected and separated from noise by the sample and hold circuit comprising buffer 7, analog switch 9, threshold detector 11 and comparator 13. These contacts state indication codes are then set into flip flops 15 and 17 under the control of a clock oscillator 19 and a timing synchronization circuit 21 which also controls analog switch 9. Then these contact state indication signals are decoded by state decoder 23 and stored in the memory 25. Timing and address synchronization are provided by the main clock oscillator 19, address generator 27, and timing sychronization circuit 21. This address generator 27 controls not only the timing of the information request pulses IR sent out by demultiplexer 5 but also the timing of the receipt of the contact state indication codes received by multiplexer 1 and operation of address selector buffer 29 which addresses memory 25 to store the decoded contact state indication codes therein. The same address is made available to the demultiplexer, the multiplexer and the memory with address changes sequentially as it scans all 32 I/O lines. One complete scan is made every 7 milliseconds and each address is held for 220 microseconds; for example, during this 220 microsecond period, the information request pulse IR is sent to the proper remote breaker electronic circuit of FIG. 1 and a reply is received, detected and decoded. After the information is decoded, address selector 29 connects this address to the memory and a writing command is sent from the timing synchronization circuit 21 to cause the information or data to be stored in the memory. The internal address and write command are connected to the memory only for 10 microseconds or the like during the 220 microsecond address period. During the majority of the time (210 microseconds) of the information request pulse IR, the address input of the memory is connected to the central processing unit CPU. Therefore, the central processing unit CPU can read from the memory the condition of each remote breaker device during this time regardless of the remote breaker device that is being addressed at that time, except during the 10 microsecond writing period. This 10 microsecond pulse is sent also to the central processing unit on conductor RNV so that it knows when the "read is not valid". This inhibiting read-not-valid signal, of course, is necessary because you cannot accurately read data from the memory at the same time that data is being written therein. The unit CPU will display data such as tripped state and breaker number on display 35. The keyboard part of device 35 is used to enter commands into the CPU in known manner.

The central processing unit controls the remote breaker devices using the same address lines ADD, one other data line DA, a chip enable line CH.EN., and one write line WR-DIS, and a read-write select line RD-WR. The address from the central processing unit which has been entered by keyboard 35 along with the command data is also connected to the control latches 3 through address bus ADD. By means of the address, data, CH.EN., RD-WR, and WR-DIS commands, it is possible to set or reset each latch, there being 32 latches, that is, one for each control line. Each command latch output is connected to one I/O sub-circuit and can drive one remote breaker device on or off. These latches can be read by sending to them RD-WR and CH.EN. signals. When this command is received, the data line of the latches becomes "information out" and the position of that latch is sent back to the central processing unit CPU. In connection with this, it is possible to inhibit state change of the remote breaker devices until the latches are checked or when there is a power fault. The command disable circuit 31 in the upper left hand portion of FIG. 2, when properly operated, disconnects the power sources from the I/O sub-circuits. Without a signal, the remote breaker devices do not change state because of the tri-state operation. This contrasts with prior devices that opened with an open control line and closed with a shorted control line.

The emergency control operation circuit or manual over-ride circuit 33 is shown at the upper left hand portion of FIG. 2. If a problem occurs with the central processing unit or its power supply, the I/O system of FIG. 2 can allow control of all of the remote breaker devices associated therewith from a three-position manual switch MSW. As schematically depicted thereat, in one position, this switch connects an all-closed signal to manual override circuit 33 to cause it to connect a minus supply to all of the I/O sub-circuits thereby causing all of the remote circuit breaker devices to close. In the other position, this switch sends a reset signal to all command latches 3 which thereby drive all of the remote circuit breaker devices to the open position. No contact state indication is available in this manual override control mode. In the third position (center), the CPU has control.

The communication between the remote breaker electronic circuit of FIG. 1 and the I/O system of FIG. 2 differs from the communication employed in prior remote control circuit breaker devices heretofore. With the prior devices, power was derived from the power line circuit and the command was an "open" or "grounded" control line. In this system, the command is sourced at the I/O system of FIG. 2 and sinked at the remote breaker electronic circuit of FIG. 1. The remote control circuit breaker main power is 115 volts AC or 28 volts DC and this high voltage source permits only low current at the control line to keep the power dissipation low within the remote control circuit breaker. But the I/O system of FIG. 2 works with a low voltage power supply and more current can be driven from it; therefore, the lines can be loaded by a lower impedance which provides better noise immunity and DC leakage protection. Also, the I/O system of FIG. 2 can transmit positive or negative voltages to the control lines, thus enlarging the voltage range between the "open" and "closed" commands which improves the noise immunity and makes the system a 3-state system. The "close" command is a DC level of −5 volts or the like. When the breaker device is operated to the "closed" position, even if the signal returns to zero (control line shorted or disconnected), the device will remain closed. It will transfer to the "open" position only when it receives the "open" command which is a DC level of +8 volts or the like.

Before proceeding with a detailed description of the circuit diagrams of the remote breaker electronic circuit shown in FIGS. 3a–c and 4a–e and the I/O system shown in FIGS. 5a–c, the manner in which the I/O system transmits command signals to cause each remote breaker to close or open and the manner in which the remote breaker electronic circuits send back breaker contact state signals to the I/O system for storage in its memory will be described generally with reference to FIG. 8. Since there is only one line with a ground return from each I/O system to the remote breaker electronic circuit, the control command on the line is time-shared with the state information coming from the remote breaker back to the I/O system for storage in its memory. As shown by curve 8a, the open command OC of +8 volts is applied continuously except when it is interrupted periodically by an information request pulse IR to obtain the status of the remote breaker contacts. Thus, each remote breaker that has been determined by the central processing unit should be open receives this open command continuously except during those times that an information request pulse is applied. This information request pulse IR is applied periodically, for example, once every 7 milliseconds or the like and has a length of 220 microseconds. The remote breaker contact state information is returned during each of these 220 microsecond information request pulses as hereinafter described in connection with FIG. 7.

Figure 8:
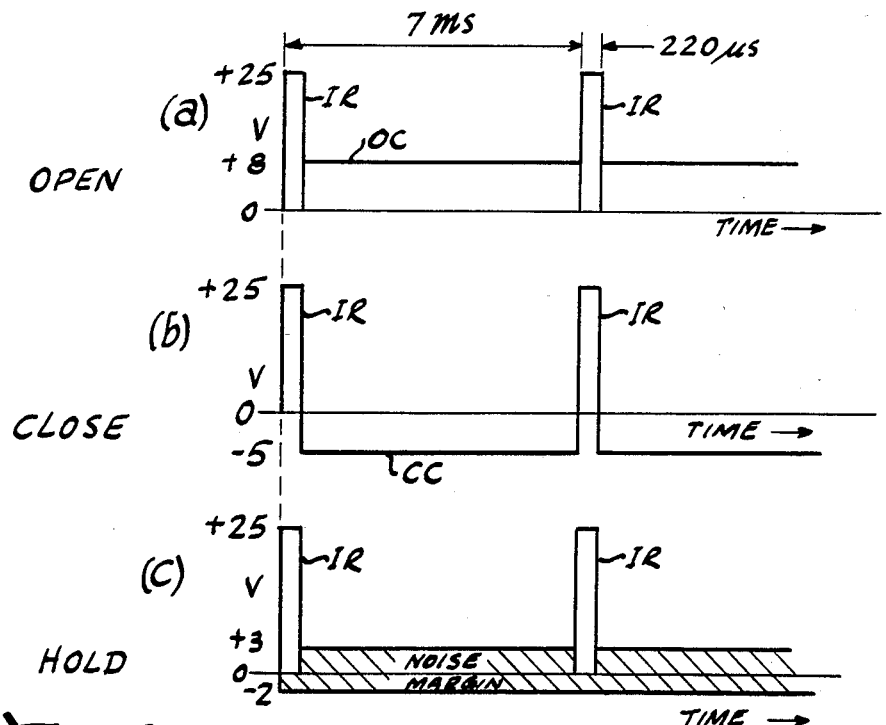
FIG. 8 is a chart showing tri-state command pulses and search pulses sent from the I/O circuit to the remote circuit breaker electronic circuit.

As shown by FIG. 8 curve (b), the close command CC is a continuous transmission of −5 volts from the I/O system over the control line to the remote circuit breaker except when it is periodically interrupted by the aforementioned information request pulse IR. Thus, in a similar manner, each remote breaker that has been determined by the central processing unit that it should be closed receives this continuous closed command CC except when interrupted periodically as aforesaid. High frequency information request pulses IR of +25 volts are used for purposes hereinafter described. FIG. 8c shows the noise immunity of the system resulting from use of 3 state communication, that is, +8 and −5 volts open and close command signals. As shown therein, if the control line is grounded, this will constitute a "hold" condition without any change of state taking place. Also, during this grounded condition noise levels of up to +3 volts with a margin of −2 volts will not affect the system or cause any change of state.

Figure 7:
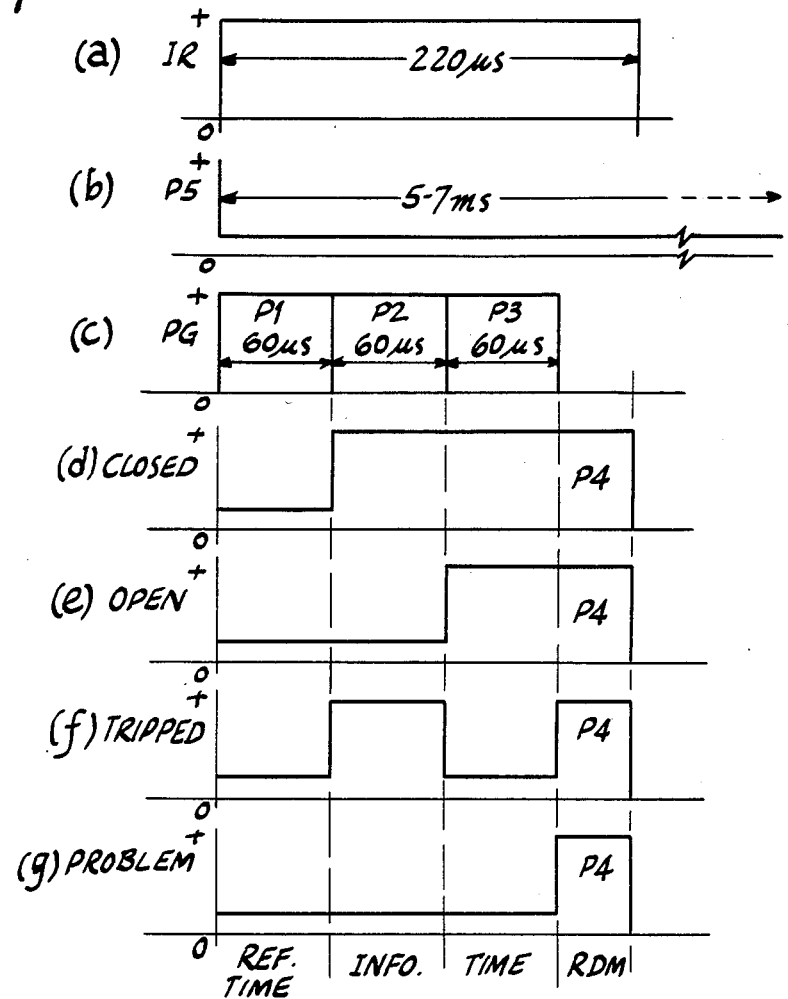
FIG. 7 is a chart showing operating characteristic curves of the remote circuit breaker electronic circuit of FIGS. 3a-c and 4a-e.

The remote breaker electronic circuitry easily filters these short 220 microsecond information request pulses IR coming from the command circuit. Every information request pulse IR triggers a reply circuit in the remote breaker electronic circuit and the contact state information is returned during that 220 microsecond pulse time. The remote breaker electronic circuit does not actually generate information pulses to send back the contact state information but only grounds or ungrounds the control line during certain generated time intervals so as to binary code the +25 volts information request pulse coming in. To afford high noise immunity, the system uses only two voltage levels to produce four different kinds of information instead of using four voltage levels. State information is based on two sequential pulses or binary bits that provide the following 4-state indication as shown in FIG. 7. FIG. 7 curve (a) shows the 220 microsecond information request pulse IR. Directly therebelow, FIG. 7 curve (b) shows a 5-7 millisecond long retriggering inhibit pulse P5, the purpose of which will become apparent hereinafter. FIG. 7 curve (c) shows three 60 microsecond long timing pulses P1, P2 and P3 that are generated by the pulse generator 14 in the remote breaker electronic circuit in response to initial receipt of the information request pulse IR. As will be apparent from the remaining curves in FIG. 7, timing pulse P1 provides an initial reference time whereafter timing pulses P2 and P3 time the shorting and opening of the control line in order to generate the closed, open, tripped and problem codes for transmission back to the I/O circuit. The state codes are as follows: For the closed state both pulses during time periods P2 and P3 are high as shown by FIG. 7 curve (e). For the open state, as shown by FIG. 7 curve (e), the first pulse is low and the second pulse is high during time periods P2 and P3, respectively. For the tripped state as shown by FIG. 7 curve (f), the first pulse is high and the second pulse is low during time periods P2 and P3, respectively. For the problem state as shown by FIG. 7 curve (g), both pulses during time periods P2 and P3 are low. After the end of each of these codes, the control line is kept open or opened to provide a "high" as a retriggering disable margin P4 to prevent immediate retriggering of the response circuit. It will be apparent that while these particular codes have been shown in FIG. 7 for illustrative purposes, it is, of course, possible to interchange these codes in all states except the problem state. It will become apparent as the description proceeds that the problem state indicates a control line connection problem, disconnected or shorted, as well as indicating that no line power is being applied to the remote breaker electronic circuit.

The manner in which the remote control circuit breaker contact state—closed, open, tripped or problem—is sensed will now be described. Before doing this, however, a contrast may be drawn with respect to prior art devices. In certain prior art devices, armature position at the remote breaker is used to provide a power contact state sensing, which is obtained by an additional set of contacts. These contacts are expensive, have to be adjusted, and are not reliable since the reliability of contacts is lower than that of an electronic circuit. In such prior devices, for sensing the trip position, another set of contacts has been used which is operated by the trip mechanism.

Figure 3A:
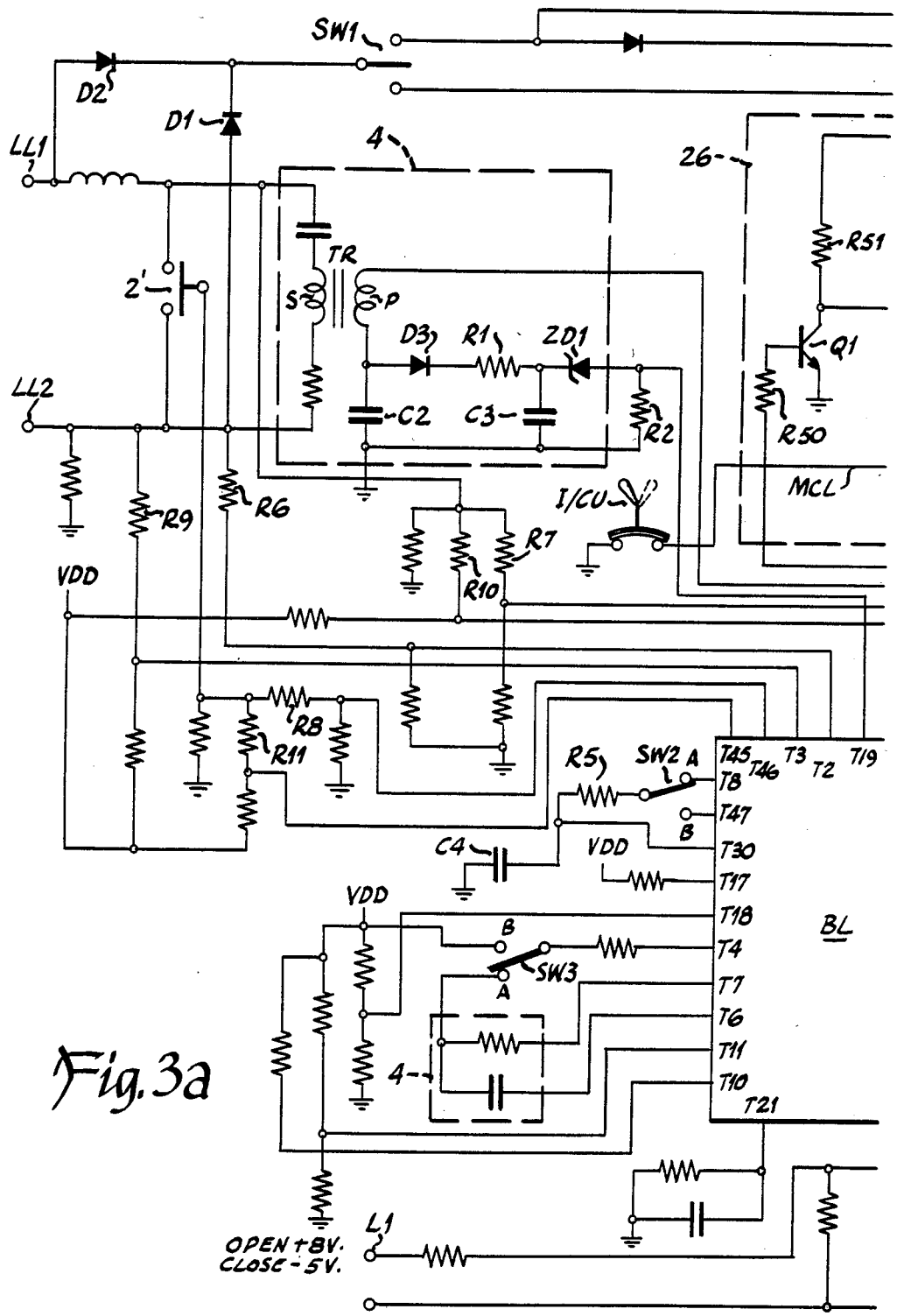
FIGS. 3a-c show a detailed circuit diagram of the remote breaker electronic circuit shown in block diagram form in FIG. 1.

In the present system, as will be described presently in connection with FIG. 3, the contact position sensor is fully electronic. This sensor circuit is shown in FIGS. 3a–b and 4a–b. Two methods are available depending upon whether the breaker contact used is a single break contact or a double break contact. Method A relates to single break contacts and method B relates to double break contacts. For single break contact sensing according to method A, switches SW2 and SW3 in FIG. 3a are set in position A as shown. Method A uses a high frequency resistance measurement of single break contacts to determine their state. A high frequency oscillator HF-OSC shown at the upper portion of FIG. 4b connected to terminals T4, T5, T6 and T7 drives through terminal T5 a resonant circuit composed of the primary P of transformer TR and capacitor C2 at the upper portion of FIG. 3a. Assuming that contact 2' at the upper portion of FIG. 3a is a single break contact, when the contact resistance is high as when the contacts are open, no impedance reflection occurs from the secondary S of transformer TR and the circuit resonates. This produces a maximum voltage across capacitor C2 which is rectified, integrated, and level shifted by the circuit comprising diode D3, resistors R1 and R2, capacitor C3 and zener diode ZD1 to provide a voltage which is proportional to the contact resistance which is applied to terminal T19. In FIG. 4a, this voltage at terminal T19 is applied to the non-inverting input of comparator CMP1 for comparison with a threshold voltage applied from the junction of voltage divider resistors R3 and R4 through terminal T18 to the inverting input of this comparator. This causes a high signal at the comparator output when the contacts are open. Diode D4 connecting ground to the non-inverting input of comparator CMP1 and diode D5 connecting the latter to supply voltage of 7 volts DC or the like constitute a voltage clamp circuit which prevents the non-inverting input of the comparator from ever going to a voltage lower than ground or a voltage higher than the supply voltage. Such voltage clamp circuits are used in a number of other portions of the system for similar reasons and will not be further described or illustrated.

On the other hand, when the breaker contact 2 resistance is low as is the case when the contacts are closed, the parallel resistance across the secondary winding S of transformer TR reflects back to its primary winding, lowering the primary impedance. This causes the resonant circuit to resonate less effectively, lowering the voltage across capacitor C2. The signal applied through terminal T19 to comparator CMP1 is now less than the threshold voltage resulting in a low signal from the output of the comparator.

To summarize, when the contacts are open, comparator CMP1 provides a high signal and when the contacts are closed, this comparator provides a low signal. The manner in which these high and low signals are used to transmit contacts open and contacts closed codes, respectively, to the I/O circuit will be described hereinafter after method B contact sensing has been described.

As aforementioned, method B is used to sense the states of double break contacts such as the double break contacts 2' shown in FIG. 3a. For method B contact sensing, switches SW2 and SW3 in FIG. 3a are set at position B. While switches SW2 and SW3 have been shown for illustrative purposes, it will be apparent that in actual practice connections may be made instead depending on the particular application.

Generally speaking, method B uses the contact voltages at the 3 nodes of a double break contact mechanism to determine contact state. When line voltage is present at all three nodes, NAND gate NG1 in FIG. 4a provides a low output signal to indicate that the contacts are closed. When the center node of the breaker contact 2' has no voltage applied to it, even if both outside contacts have line voltage present, the output of NAND gate NG1 is high thereby indicating that the contacts are open. The manner in which this comes about will now be described.

Since the contact state sensing electronic circuit can be powered by voltage applied to either contact, the circuit is completely symmetrical and the line and load terminals can be interchanged. Both line terminals LL1 and LL2 can also be used as line terminals in a bus tie application and the contact position sensor will provide the proper state information.

The single break contact state signal is applied from the output of comparator CMP1 in FIG. 4a through terminal T8 to switch SW2 or the double break contact state signal is applied from the output of NAND gate NG1 through terminal T47 to switch SW2 depending upon whether single break or double break contacts are being sensed. Depending upon the position of switch SW2, the respective contact state signal is then in the integrated circuit comprising resistor R15 and capacitor C4 to provide a signal to terminal T10 that is to affected by any contact bounce that may occur when the contacts switch. In this connection, it should be noted that some of the circuit components outside of block BL in FIGS. 3a-b are shown also in FIGS. 4a-e for convenience of reference when the circuit within the block 1 is being described.

The manner in which the open-close states of the double break contacts 2' is sensed will now be described. Referring to FIG. 3a, the power side of the breaker contact 2' is connected through resistor R16 to terminal T2 and then from terminal T2 in FIG. 4a to the upper input of NAND gate NG1. In a similar manner, the upper side of break contact 2 in FIG. 3a is connected through resistor R17 to terminal T44 and then from terminal T44 in FIG. 4a to the middle input of NAND gate NG1. And the movable bridging contact is connected through resistor R18 to terminal T46 and then in FIG. 4a–b from terminal T45 to the lower input of NAND gate NG1. These three connections will suffice when DC voltage is used on line terminals LL1 and LL2. However, when AC power is used on power line terminals LL1 and LL2, these three connections will conduct only the positive half cycles of voltage to NAND gate NG1. To provide for contacts state sensing during the negative half cycles of such AC power, three more connections are provided. For this purpose, the lower side of contacts 2' is connected through resistor R9 to terminal T3 and then in FIG. 4a from terminal T3 to the gate of a driver in the form of a p-channel field effect transistor FET1. As will be apparent, a negative voltage on its gate will turn this transistor on to apply supply voltage VDD to the upper input of NAND gate NG1, supply voltage VDD being 7 volts DC or the like. In a similar manner, the upper side of contacts 2 is connected through resistor R10 to terminal T1 and then in FIG. 4a from terminal T1 to the gate of a driver in the form of a like field effect transistor FET2. This transistor operates in a similar manner. When a negative half cycle of voltage is applied to its gate, it turns on and applies supply voltage VDD to the middle input of NAND gate NG1. And the bridging contact is connected through resistor R11 to terminal T45 and then in FIG. 4a from terminal T45 to the gate of a driver in a form of a like field effect transistor FET3. When a negative half cycle is applied to the gate of this field effect transistor, it turns on to apply supply voltage VDD to the lower input of NAND gate NG1. To summarize, comparator CMP1 senses the state of single break contacts 2 or NAND gate NG1 senses the state of double break contacts 2'. In each case, the output is low for closed contacts and the output is high for open contacts.

As hereinbefore mentioned, this system is also capable of sensing whether there is a problem condition on the power line. As hereinbefore described, the upper and lower sides of contact 2 are connected to terminals T44 and T2, respectively, in FIGS. 3a–b and then from these terminals in FIG. 4a to the two inputs of NOR gate NOR1. It will therefore be seen that whenever there is voltage on either power line conductor, the output of this NOR gate will be low. This is indicative of the normal, trouble-free condition and this low is applied through terminal T41, resistor R12, terminal T9, Schmitt trigger circuit ST1 and inverter IN1 whereinverter has inverted to a high which is applied to one input of NAND gate NG2. On the other hand, if there is a problem on the power line such as no line voltage, both inputs of NOR gate NOR1 are low so that the output thereof is high. This high at the output of the NOR gate is applied via the circuit comprising resistor R12 and filter capacitor C6 and then is applied through terminal T9 and Schmitt trigger circuit ST1 to the inputs of NAND gates NG3 and NG4 in information encoder circuit 10 at the end of power right hand position of FIG. 4a. The manner in which this high on these NAND gates will be used to generate a problem code will be described hereinafter.

Powerup circuit PU at the lower left hand portion of FIG. 4a functions as follows to reset the set-to-dominated seed position memory of in FIG. 4a, and the set-dominated overlock triplatch OD T in FIG. 4a. When power is initially applied to the system at high is applied from supply VDD through resistor R13, terminal T10, Schmitt trigger circuit ST2 and inverter IN2 to provide a low on the gate of field effect transistor FET4 to turn it on. As a result, current flows from supply VDD through transistor FET4 and terminal T21 to charge capacitor C7. The voltage on this capacitor is applied through terminal T21 to operate Schmitt trigger circuit ST3 which applies a signal through inverter IN3 to one input of NAND gate NG5 to cause the latter to provide a positive-going pulse to reset closed position memory 6 as well as overload trip latch OLT in FIG. 4c. Transistor FET4 is a p-channel device so that a negative or low signal on its gate turns it on. When the applied power rises near its full value, the voltage divider comprising resistors R14 and R15 applies a positive signal through terminal T11 to the gate of n-channel field effect transistor FET5 to turn it on. As a result, a low signal is applied from ground through this transistor and Schmitt trigger circuit ST2 and inverter IN2 to turn transistor FET4 off. As a result, capacitor C7 discharges through resistor R16. To summarize, power-up circuit PU responds to application of power to the system to provide a positive pulse for the purpose of resetting close position memory 6 and overload trip latch OLT into readiness for proper operations. This resetting is done with a suitable delay provided by discharging of capacitor C7 to afford time for the power to come up to its full value before the system can be operated.

The power-up circuit PU is also an undervoltage sense circuit. Under this condition, transistor FET5 will turn off under control of voltage divider R14–R15, thereby allowing transistor FET4 to turn on, thus allowing capacitor C7 to charge. As a result, Schmitt trigger circuit ST3 is triggered high and this high signal is applied through conductor CN1 in FIG. 4a–c and then through NOR gate NOR2, NAND gate NG6 and NOR gates NOR3 and NOR4 and inverter IN26 to hold terminals T23 and T24 and T31 low, thereby to lock out the logic circuit so that open and close and operate commands cannot be transmitted therethrough.

When full voltage is restored to the system, transistor FET4 will be turned off as hereinbefore described to allow capacitor C7 to discharge and thereby terminate the logic circuit disabling or lockout condition.

Before proceeding with a description of the information encoder 10 in FIG. 4a and how the contact state signals or codes are transmitted back to the I/O circuit, a description will be given of the manner in which the command signals are transmitted from the I/O circuit to the remote breakers to cause them to close or open their contacts and also the manner in which information request pulses are transmitted from the I/O circuit to the remote breaker electronic circuit to cause the latter to send back the contact state signals.

Referring to the I/O system in FIGS. 5a–c, command signals are transmitted through control lines L1–L32 to the remote breakers as follows. Central processing unit CPU shown at the right hand portion of FIG. 5c sets control latches 3a–d in FIG. 5b in accordance with the desired states of the remote breakers. For this purpose, the central processing unit CPU selectively addresses control latches 3a–d by applying signals thereto over address lines A0, A1, and A2, one of the latch (chip) enable lines LE1–4 since there are four 8-bit addressable latches 3a–d, data line DA and write-read line WR–RD. The particular signal applied to data line DA will determine whether the particular latch will be set or reset. If the latch is set, a "high" signal will be applied from its output terminal such as QO through line CN2 to AND gate AG1 which is normally receiving a "high" signal at its upper input terminal. The central processing unit CPU also applies a command enable signal CE at the upper right hand portion of FIG. 5c through resistor R17 to the base of transistor TR1. This command enable signal is a high to enable the command and a low to disable the command. This high command enable signal is filtered by capacitor C8 and resistor R18 and turns on transistors TR1 and TR2 under the control of resistors R19 and R20, respectively. At the same time, transistors TR3 and TR4 are held off. Transistor TR2 applies a positive voltage of 10 volts or the like over a line CN3 to the command disable circuit 31 in FIG. 5a. This positive voltage is applied through zener diode ZD2 and resistors R21 and R22 to turn transistor TR5 on. As a result, −5 volts is applied through transistor TR5 and line CN4 to the lower side of line driver field effect transistor FET6 which is of the n-channel type, so that it requires a positive signal on its gate for turn-on. The command enable signal on conductor CN3 is also filtered by capacitor C9 and applied through resistors R23 and R24 to the upper side of transistor FET6.

It will now be seen that if line driver transistor FET6 is turned on, a close command signal of −5 volts will be applied through resistor R25 to line L1, whereas, if line driver transistor FET6 is turned off, an open command signal of +8 volts or the like will be applied to line L1. Since the outputs of demultiplexers 5a and 5b are low except when an information request pulse is being generated, and such low signal is connected through resistors R26 and R27 to ground, a high signal as aforesaid is applied from the output of inverter IN4 to the upper input of AND gate AG1. Diode D6 clamps the voltage at the junction of resistors R26 and R27 and the input of inverter IN4 so that it will not go above supply voltage VDD. Assuming that the first control latch is set, a positive voltage is applied from the output QO of 8-bit addressable latch 3a through conductor CN2 to the lower input of AND gate AG1. As a result, the high at the output of AND gate AG1 is applied through zener diode ZD3 and resistor R28 to −5 volts. This causes turn on of transistor FET6 to apply a −5 volt close signal to line L1. As shown by curve (b) in FIG. 8, this close command signal of −5 volts is continuously applied to the control line except when it is interrupted by the application of an information request pulse IR as hereinafter described. In a similar manner each of the control latches is addressed by the CPU and the latch therein is set or reset according to whether the corresponding remote circuit breaker should be closed or open. As will be apparent, there are four 8-bit addressable latches 3a–d each having 8 outputs for applying control commands to the 32 control lines. When a particular control latch is reset under the control of the CPU, the corresponding output therefrom is low and turns off the corresponding AND gate such as AG1, thereby to cause a +8 volt open command signal to be applied to the control line as shown by the curve (a) of FIG. 8. This open command signal OC is also continuous except when it is interrupted by an information request pulse IR.

The manner in which an information request pulse is generated will now be described with reference to FIG. 5a–b. Oscillator 19 at the upper portion of FIG. 5b which comprises resistors R29, R30 and R31, inverters IN5 and IN6 and capacitors C10 and C11 generates clock pulses (a) shown in FIG. 6 for operation of address generator 27 in the form of a 5-stage binary counter of the 4024 type or the like. This address generator 27 responds to the clock oscillator pulses and provides binary signals from its output terminals Q1–Q5 for operation of two 16 channel search pulse demultiplexers 5a and 5b. As will be apparent outputs Q1–Q4 of the address generator address the 16 channels of demultiplexer 5a in sequence whereas signal Q5 of the address generator enables demultiplexer 5a during the first 16 counts. Output Q5 then enables 16 channel demultiplexer 5b while outputs Q1-Q4 address channels 17 through 32 thereof. Each time a channel of the demultiplexer is addressed, a 25 volt information request pulse IR shown by curve (b) in FIG. 6 is applied from its corresponding output through diode D7 and resistors R24 and R25 to control line L1. At the same time, an inhibit signal is applied from the same output of the demultiplexer through resistor R26 and inverter IN4 to provide a low signal to the upper input of AND gate AG1 to gate it off, thereby inhibiting the command signal that was coming in on line CN2. These information request pulses IR are shown by curve (b) in FIG. 6 as 220 microsecond pulses.

Referring again to FIGS. 4a-e, it will be described how the aforementioned command signals are received and transmitted to the remote breakers to change the states thereof. Let it be assumed that a close command signal of −5 volts is appled to the control line and is received therefrom at the left hand portion of FIG. 4d. This command signal comes in on line L1 and is applied through a voltage divider comprising resistors R32 and R33 to ground, there being a transorb TA1 across resistor R33 for suppressing transients, and is applied from the junction of resistors R32 and R33 through resistor R34 to line CN5, there being a transient suppressing capacitor C12 connected from conductor CN5 to ground. This command signal is then applied in FIG. 4e from line CN5 through resistor R35, zener diode ZD4, diode D8 and terminal T38 to inverter IN8 in FIG. 4c where it is inverted to a positive signal and applied to the set input of command latch CL so as to set this latch and provide a positive signal from its Q output. This positive signal turns field effect transistor FET7 on to apply a low signal from ground therethrough to command line CL and through Schmitt trigger circuit ST4, NOR gate NOR5, inverter IN9 and NOR gate NOR4 to provide a close signal at terminal T24. Referring to FIGS. 3b-c, it will be apparent that a high signal at terminal T24 is applied through diode D9 to the gate of an n-channel field effect transistor FET8 driver for operating close coil CC thereby causing the contacts of the circuit breaker to close. Diode D10 is connected across close coil CC to pass current in response to the induced energy when the coil is subsequently deenergized.

The manner in which the length of the close command pulse is timed by the line voltage timer in FIGS. 4c and 4e will now be described. Prior to the receipt of the close command, the output of NOR gate NOR5 at the middle of FIG. 4c was low because its upper input was high. This high voltage came from supply source VDD in FIG. 3c through resistors R48, R49 and R47 in FIG. 3b filtered by capacitor C25 of filter 34c, and then through terminal T36 and Schmitt trigger circuit ST4 in FIG. 4c to the upper input of NOR gate NOR5. As a result, the low at the output of NOR gate NOR5 was applied to the gate of p-channel field effect transistor FET13 to turn it on, thereby applying a voltage therethrough and through terminal T28 to charge capacitor C18 in close command timer CCT in FIG. 4e. When the voltage on capacitor C18 reaches the threshold level of Schmitt trigger circuit ST9, the latter applies a high signal to one input of NAND gate NG12. Now, when the close command is applied and the output of NOR gate NOR5 goes high as aforesaid, this high turns transistor FET13 off, thus, disconnecting supply voltage VDD from capacitor C18, thereby causing capacitor C18 to discharge through its parallel resistor R40 which continues for a timed interval. This high which was applied to transistor FET13 is also applied to the other input of NAND gate NG12 to cause its output to go low, thereby switching one input of NAND gate NG8 from high to low. Prior to that, all four inputs of NAND gate NG8 were high. This causes the output of NAND gate NG8 to go high for the time interval of close command timer CCT and to turn on parallel-connected n-channel field effect transistors FET10a-c. These transistors cause discharge of capacitor C14 of line voltage timer LVT through terminal T32 to ground. As will be apparent, the time interval of close command timer CCT is long enough to insure discharge of capacitor C14 of line voltage timer LVT. At the end of this time interval, when the voltage on capacitor C18 of the close command timer falls below the threshold of Schmitt trigger circuit ST9, a low signal is applied therefrom to one input of NAND gate NG12 to turn off transistors FET10a-c. This allows line voltage timer LVT to measure a charging time interval which times the length of the close coil pulse applied from terminal T24 to the close coil of the breaker. Capacitor C14 charges from the line voltage through resistor R37 as also shown in FIG. 3b and this charging time interval is short when the line voltage is high and longer when the line voltage is lower. In this manner, the length of the close coil pulse is adjusted to what is needed to insure operation of the breaker in most cases.

Figure 4A:
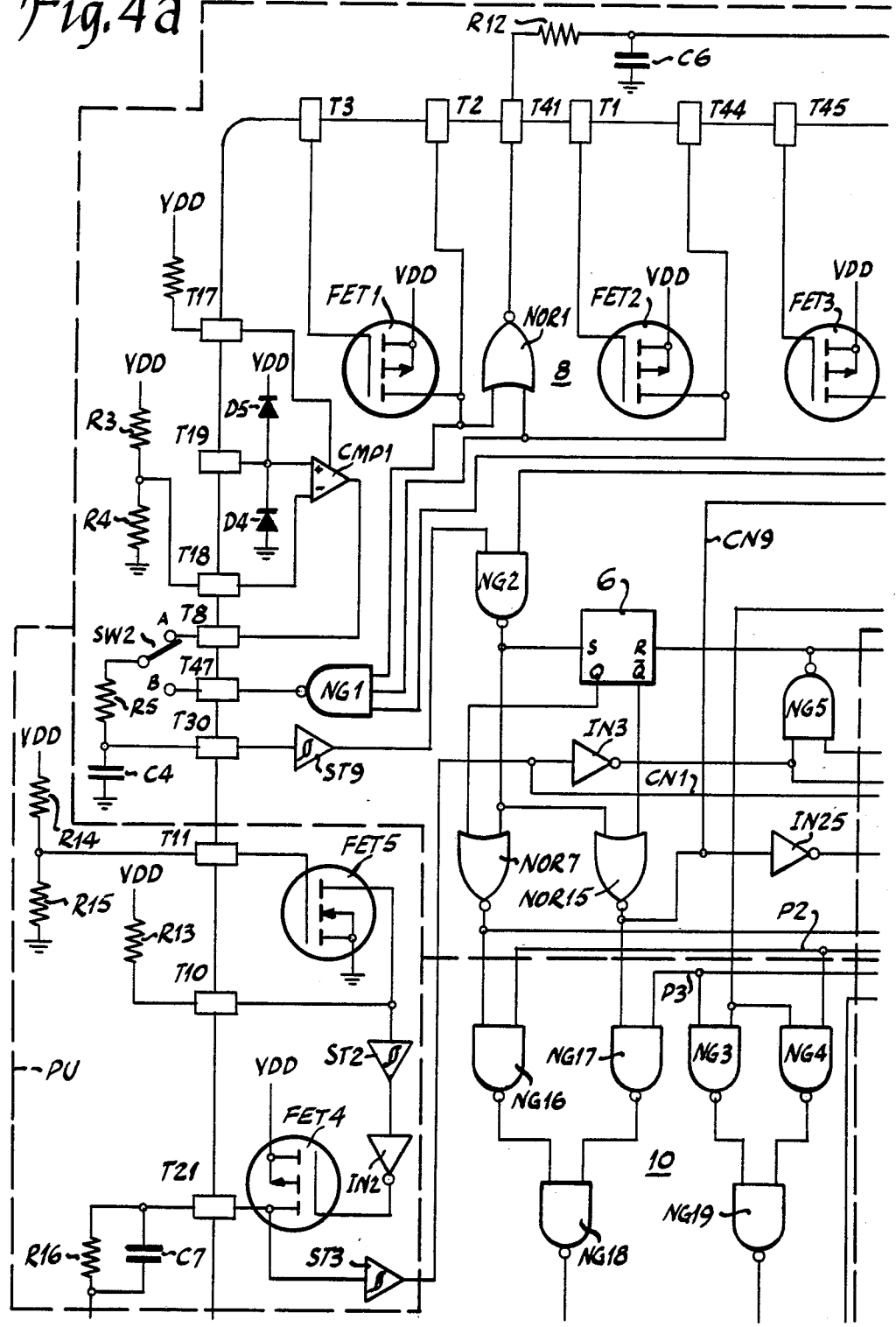
Figure 4B:
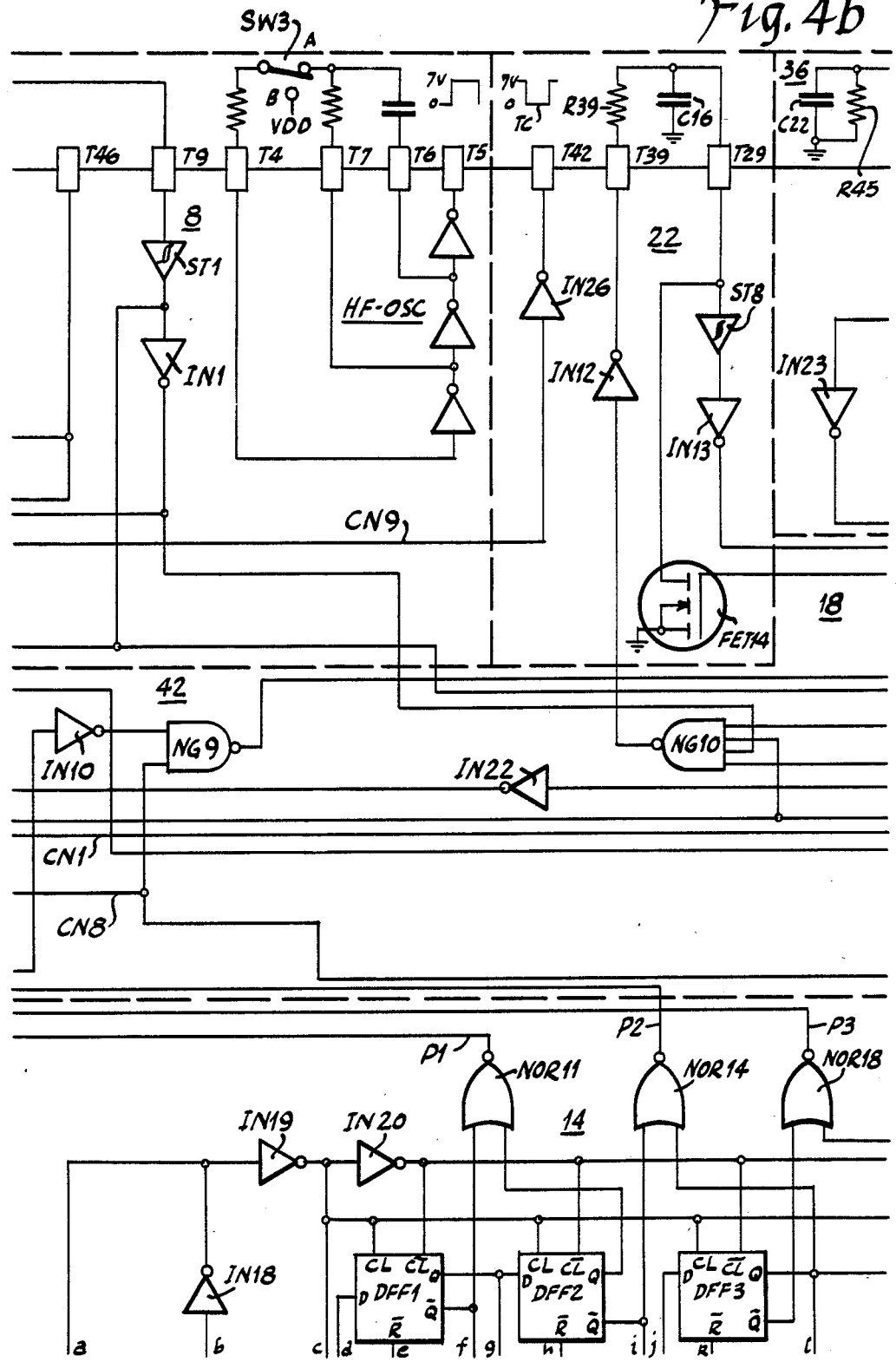
Figure 4C:
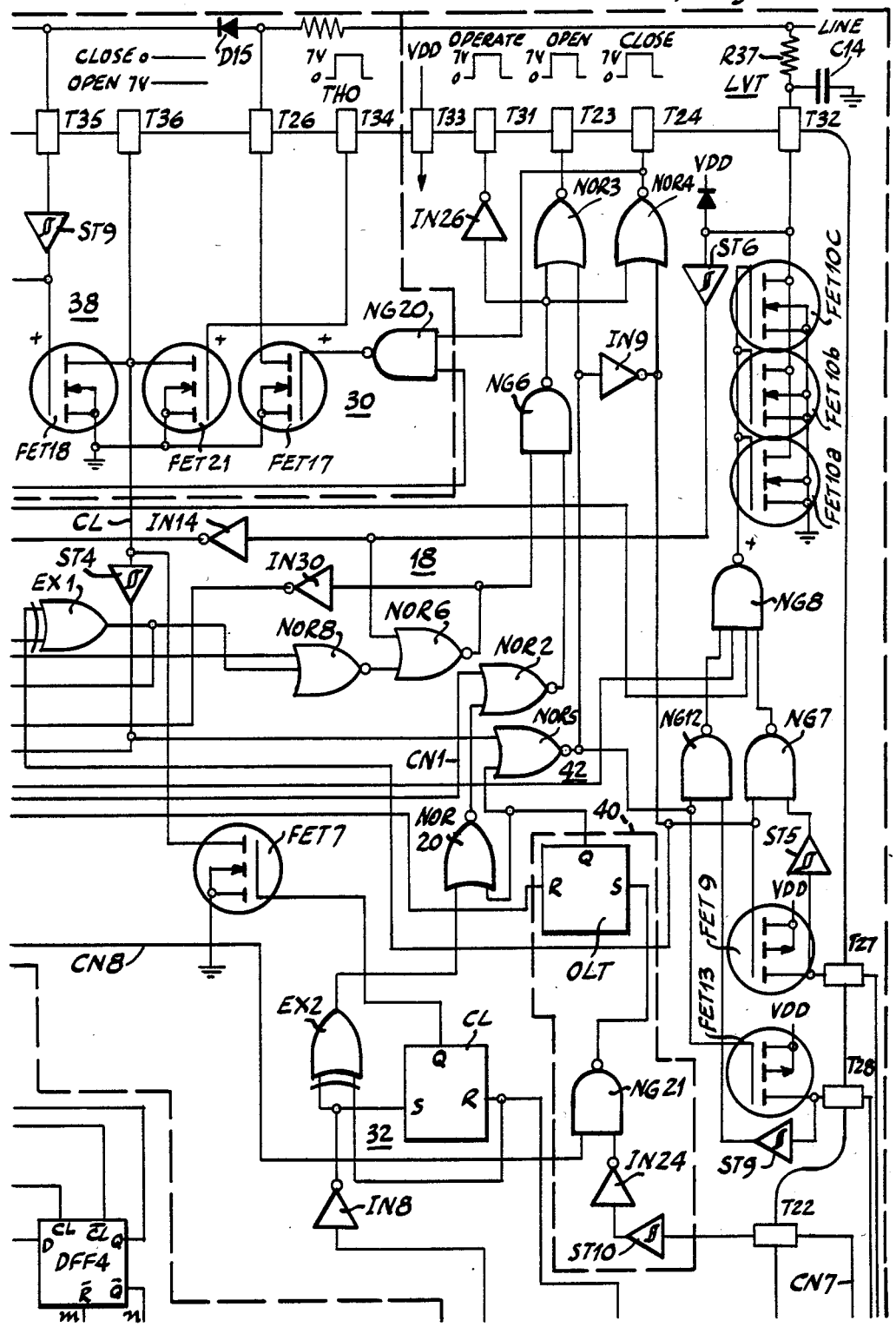

At the end of this line voltage timer time interval, a signal is applied in FIG. 4c through Schmitt trigger ST6, NOR gate NOR6, and NAND gate NG6 to NOR gate NOR4 to terminate the close command pulse at terminal T24. Thus, when capacitor C14 charges to the threshold level of Schmitt trigger circuit ST6, its output goes high which is applied to one input of NOR gate NOR6. This high at one input of NOR gate NOR6 due to line voltage timer LVT, will terminate the close command pulse provided the other input of NOR gate NOR6 due to contact closure sensing, has not already done so as hereinafter described. In either such event, the low at the output of NOR gate NOR6 is applied through NAND gate NG6 to cause the output of NOR gate NOR4 to go low thereby terminating the close command pulse.

It will be recalled that at the start of the close command pulse, the output of inverter IN9 in FIG. 4c went low. This low was applied not only to NOR gate NOR4 to start the close command pulse but was applied also to the gate of p-channel field effect transistor FET9 to turn it on, thereby connecting supply voltage VDD therethrough and through terminal T27 to charge capacitor C13 of open command timer OCT in FIG. 4e, preparatory to timing the tripping of the line voltage timer when a subsequent open command pulse is applied.

Exclusive OR gate EX1 at the left hand portion of FIG. 4c provides alternative means for terminating the close command pulse when the contacts transfer so that the close command pulse is not applied any longer than it is needed. For this purpose, the close command low signal is applied from the output of inverter IN9 to the upper input of exclusive OR gate EX1 and the contact state signal is applied to the lower input of exclusive OR gate EX1. This contact state signal, low if closed, is applied from the output of NOR gate NOR7 of information encoder 10 in FIG. 4a through inverter IN10 and NAND gate NG9 in FIG. 4b to the lower input of exclusive OR gate EX1. The manner in which this signal is obtained at the output of NOR gate NOR7 in FIG. 4a will become apparent from the description of the operation of the information encoder 10 hereinafter appearing.

It will now be apparent that when the contacts close, the contact state signal applied to the lower input of exclusive OR gate EX1 will also change to a low causing the output signal of the latter to change to a low and this output signal is applied through NOR gates NOR8 and NOR6, NAND gate NG6 and NOR gate NOR4 to cause the contact close command pulse at terminal T24 to terminate.

When the contacts do not transfer due to low line voltage, it is not desirable for exclusive OR gate EX1 in FIG. 4c to terminate the command pulse as hereinbefore described. It will be recalled that normally exclusive OR gate EX1 compares the command with the sensed state of the contacts and terminates the breaker operating pulse when the contacts transfer so that the sensed state matches the commanded state of the contacts. Such termination of the breaker operating pulse may occur during the time that the line voltage timer is timing the length of the pulse. For this purpose, it will be apparent that NOR gate NOR8 at the middle of FIG. 4c has two inputs and when two lows are applied to its inputs, its output goes high to terminate the command pulse. The lower input to NOR gate NOR8 comes from exclusive OR gate EX1 and goes from high to low when the contact's state and the command match, thereby to terminate the command pulse. The upper input to NOR gate NOR8 comes from the line voltage sensing circuit in FIG. 4b and is normally low when there is voltage on the line but goes high when no line voltage is sensed. Under such low line voltage conditions, exclusive OR gate EX1 does not terminate the command pulse through NOR gate NOR8.

The circuit incorporates a provision for reactivation of the control signal command in the event of a contact transfer failure. This circuit is connected to terminals T29 and T39 in FIG. 4b. Assuming that the breaker contacts have not transferred after the line voltage timer has initially timed out, a signal will be developed to trip the line voltage timer again. For this purpose, with the command signal and contact state producing a mismatch at the input of exclusive OR gate EX1, the output of the latter is applied through NAND gate NG10, inverter IN12, terminal T39 and resistor R39 to charge capacitor C16 which will charge for about 2 seconds or the like. If the contacts still have not transferred at the end of this 2 second interval, the voltage on capacitor C16 will be applied through terminal T29 to trip Schmitt trigger circuit ST8 and cause a signal to be applied through inverter IN13 to one input of NAND gate NG8 in FIG. 4c to turn field effect transistors FET10a-c on thereby to retrigger the line voltage timer. As a result, the line voltage timer will control the application of another close command pulse as hereinbefore described to attempt to close the contacts and this will continue every 2 seconds or the like until the contacts close.

Figure 4D:
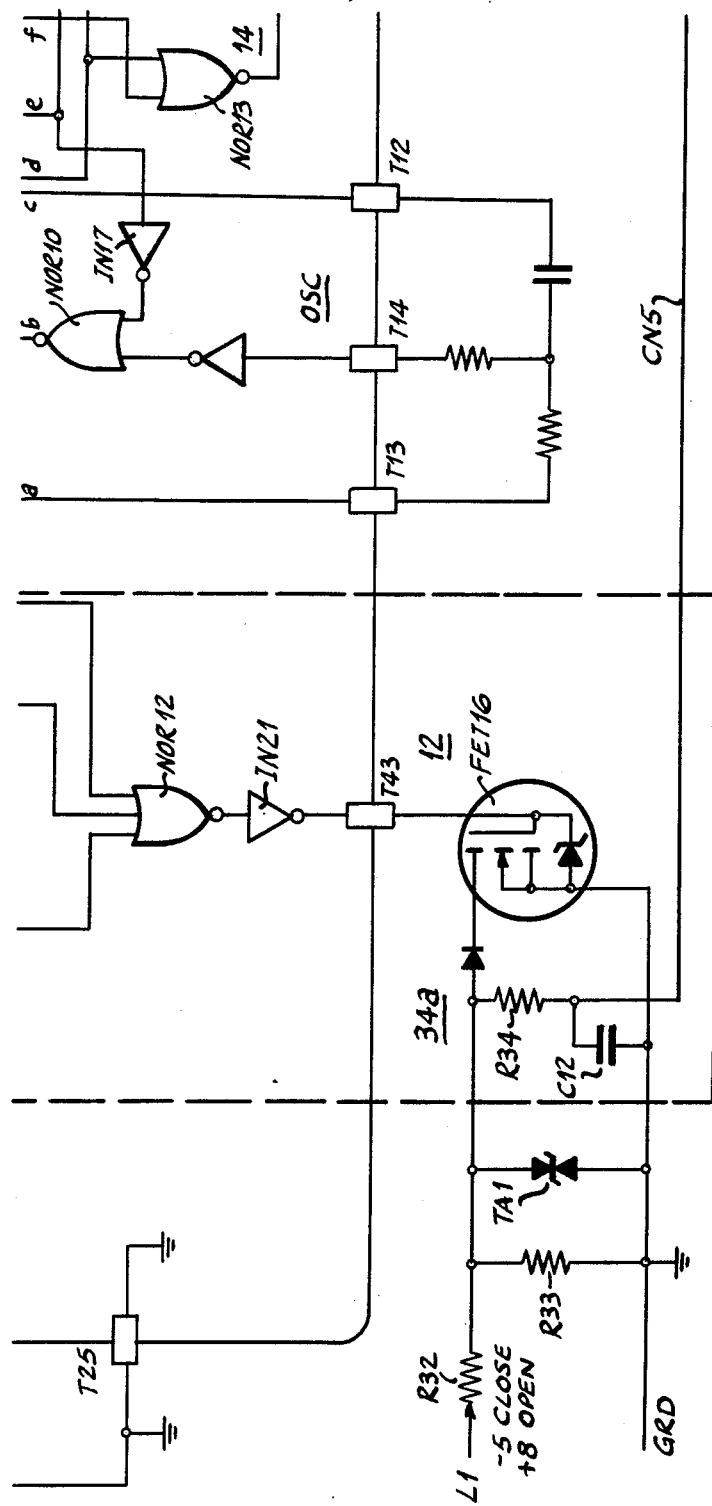
Figure 4C:
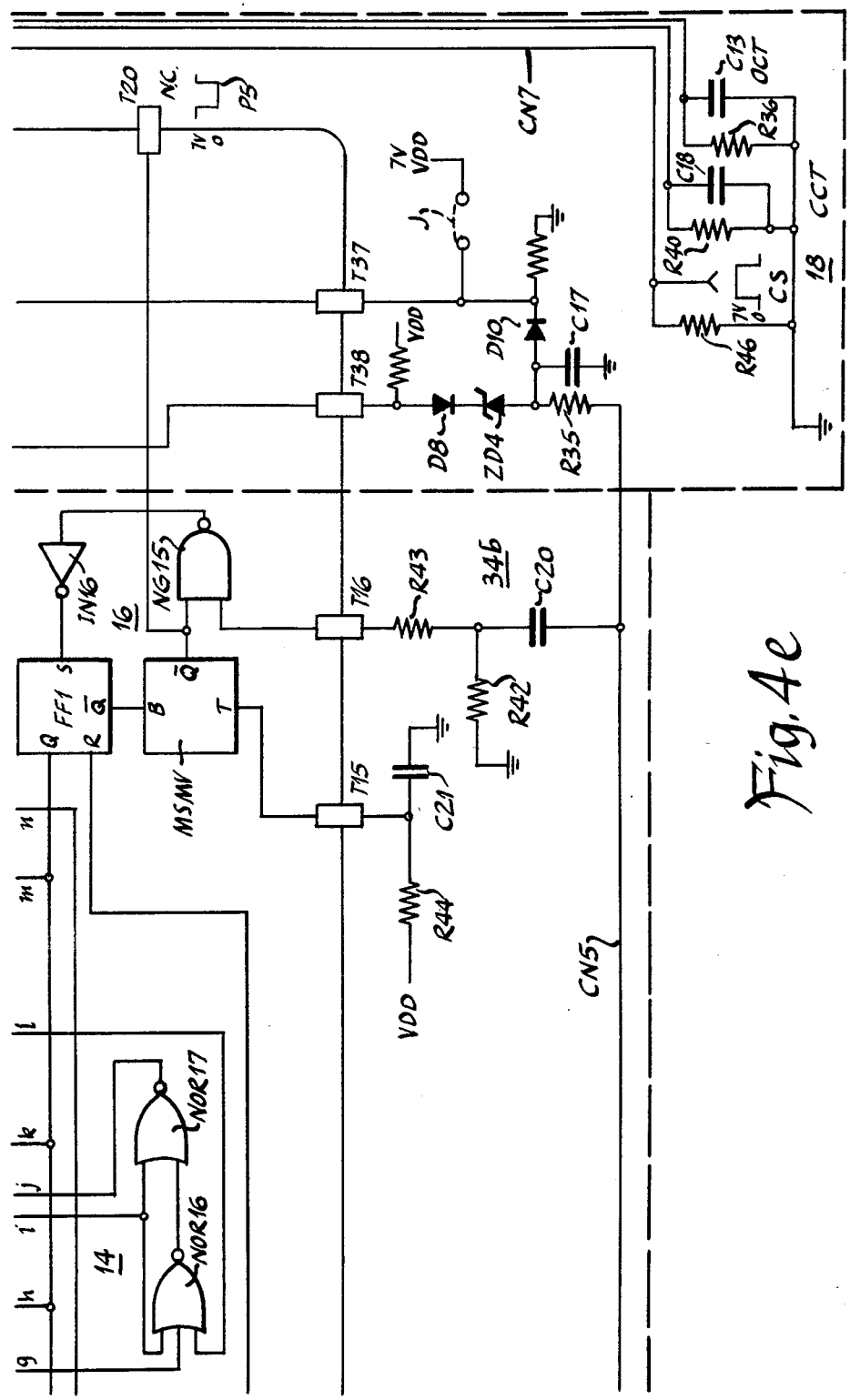

When an open command signal is applied to the control line, this +8 volt "high" logic signal is received on line L1 at the left hand portion of FIG. 4d and applied through line CN5, the low frequency pass filter comprising resistor R35 and capacitor C17 and then through diode D10 and terminal T37 to the reset input of command latch CL to reset this latch causing its Q output to go low and turn off transistor FET7. As a result, the low close command signal previously applied by transistor FET7 to the command line CL input of Schmitt trigger circuit ST4 now goes high and this high is applied through NOR gates NOR5 and NOR3 to terminal T23 to provide an open command pulse to the circuit breaker. The low output of NOR gate NOR5 is also applied to the gate of field effect transistor FET13 which turns on and through terminal T28 charges capacitor C18 of close command timer CCT shown at the lower right hand portion of FIG. 4e.

The manner in which the length of the open command pulse is timed will now be described. The low signal at the output of NOR gate NOR5 is also applied through inverter IN9 to change the voltage at the gate of transistor FET9 from low to high, thereby turning this transistor off. This high is also applied to one input of NAND gate NG7. Since the other input of NAND gate NG7 is also receiving a high from capacitor C13 of open command timer OCT at the lower right hand portion of FIG. 4e through terminal T27 and Schmitt trigger circuit ST5, gate NG7 produces a low output. The low output of NAND gate NG7 is applied to one input of NAND gate NG8 thereby to cause its output to go high and turn on parallel transistors FET10a-c. As a result, capacitor C14 of line voltage timer LVT is discharged to ground. Capacitor C13 of open command timer OCT in the meantime discharges through resistor R36 producing a time interval signal at the output of trigger ST5 long enough to discharge the line voltage timer capacitor C14. When the discharge voltage of capacitor C13 falls below the threshold of Schmitt trigger circuit ST5, transistors FET10a-c are turned off, thereby allowing recharging of line voltage timer LVT capacitor C14 to provide a charging time interval that times the length of the open command pulse. At the end of this time interval, when the voltage on line voltage timer capacitor C14 rises to the threshold of Schmitt trigger circuit ST6, the latter applies a high to one input of NOR gate NOR6, thereby to terminate the open command pulse if it has not previously been terminated by the contact state sensing by exclusive OR gate EX1. The operation then continues in a similar manner as hereinbefore described in connection with the close command signal in that the length of the open command pulse is controlled by the line voltage timer, shorter for higher line voltage than for lower line voltage, and is terminated either by expiration of the time interval of the line voltage timer or by transfer of the contacts to open state as hereinbefore described. Furthermore, if the contacts do not transfer to the open position in response to the open command, the control signal repeat after transfer failure circuit connected to terminals T39 and T29 in FIG. 4b will function to retrigger the line voltage timer and reapply the open command to the circuit breaker coil as hereinbefore described in connection with the close command. Following each such retriggering of the line voltage timer, a signal is also applied from Schmitt trigger circuit ST6 at the upper right hand portion of FIG. 4c through inverter IN14 to the gate of n-channel field effect transistor FET14 to turn the same on and discharge capacitor C16 preparatory to recharging it for a 2 second interval in the event the contacts do not transfer after the retriggering of the line voltage timer. Referring to FIGS. 3b and 3c, it will be apparent that the open command pulse is applied from terminal T23 through diode D11 to the gate of field effect transistor FET15 to turn it on and energize open coil OC thereby to open the breaker contacts.

From the foregoing, it will be apparent that if a close command is applied while the contacts are already closed or if an open command is applied while the contacts are already open, exclusive OR gate EX1 will inhibit the close or open command, respectively, in the same manner as it terminated the respective close or open command pulse as hereinbefore described.

The manner in which the closed, open and tripped contact status signals and the no line status signal are generated and transmitted over control line L1 to the I/O circuit will now be described with reference to information encoder 10 in FIGS. 4a and 4d and status pulse generator 14 in FIGS. 4b, 4d and 4e. Generally, as hereinbefore mentioned, a 25 volt information request pulse IR, 220 microseconds in length is transmitted by the I/O circuit over control line L1 as hereinbefore described. During this information request pulse, the status pulse generator modulates the impedance to ground of (shorts or opens) this 25 volt control line under the control of the information encoder to generate the status codes shown in FIG. 7d–g.

This information request pulse IR is transmitted from line L1 at the left hand portion of FIG. 4d through line CN5 and is passed by the high pass filter 34b comprising resistor R42 and capacitor C20 and then goes through resistor R43 and terminal T16 to the lower input of NAND gate NG15. This is a high signal and since the $\overline{Q}$ output of monostable multivibrator MSMV to the input of NAND gate NG15 is also high as indicated by the front of the pulse P5 adjacent terminal T20 at the right hand portion of FIG. 4e, the output of NAND gate NG15 goes low which is inverted to a high by inverter IN16 thereby to set R-S flip-flop FF1. This causes the Q output of the R-S flip-flop to go high which removes the reset signal from D-type flip-flops DFF1, DFF2, DFF3 and DFF4 and also enables NOR gate NOR10 in oscillator OSC, this enabling signal being inverted to a low by inverter IN17. This allows the oscillator to operate and pulses to be transmitted through NOR gate NOR10 and inverters IN18 and IN19 to the clock inputs C of flip-flops DFF1-4 as well as inverted oscillator pulses through inverter IN20 to the clock enable inputs $\overline{CL}$ of these flip-flops. At the same time, a data signal is applied from the $\overline{Q}$ output of flip-flop DFF4 to the data input D of flip-flop DFF1 so that the first clock pulse sets the $\overline{Q}$ output of the first flip-flop DFF1 low thereby causing NOR gate NOR11 to transmit a high the first 60 microseconds, pulse P1, to NOR gate NOR12 of the information encoder in FIG. 4d. This causes a high signal to be transmitted out of inverter IN21 to the gate of field effect transistor FET16 to turn it on and short the line to ground for the duration of the P1 pulse as shown in FIG. 7d–g to provide a 60 microsecond reference time. As hereinafter described, the I/O system in FIG. 5a–c uses this reference time to test the noise on the line in order to establish a reference level for data signals which follow.

Referring again to the status pulse generator 14 at the lower portion of 4b, the Q output of flip-flop of DFF1 provides a signal for the data input D of flip-flop DDF2. Also, the $\overline{Q}$ output of flip flop DFF1 provides a signal to one input of reset NOR gate NOR13 which will eventually be used to reset flip-flop DFF1 in triggering circuit 16 as hereinafter described. The next clock pulse from the oscillator sets flip-flop DFF2 which turns off NOR gate NOR11 and at the same time turns on NOR gate NOR14 to generate pulse P2. As shown in FIG. 7d–g this pulse P2 times the first information pulse of the 2-pulse status codes. As shown in FIGS. 4a–b, this high pulse P2 is applied to NAND gates NG4 and NG16 in the information encoder 10.

It will now be seen with reference to FIG. 7 that if the contact is open or if there is a problem such as no power to the controlled power lines LL1 and LL2, transistor FET16 will be turned on to ground the line during this pulse P2 time. On the other hand, if the contact is closed or tripped, the information encoder 10 will keep transistor FET16 turned off to keep the control line ungrounded with the 25 volt information request signal IR thereon.

The way in which this comes about is as follows. NOR gate NOR12 has three inputs. The right hand input receives a high pulse P1 from the first output of the status pulse generator to short the line during the reference time. The left hand input receives a high signal from NAND gate NG18 if the contact is open and receives a low signal if the contact is closed or tripped during status pulse generator time P2. The middle input of NOR gate NOR12 receives a high signal from NAND gate NG19 during status pulse generator time periods P2 and P3 if there is no power applied to the circuit. During timing pulse period P3, the left hand input of NOR gate NOR12 receives a high signal if the contact is tripped and receives a low signal if the contact is either closed or open.

It will be recalled from the foregoing description of the contact position sensor that terminal T30 at the left hand portion of FIG. 4a receives a low signal if the contact is closed and a high signal if the contact is open. Assuming that the contact is closed, this low signal will be applied through Schmitt trigger circuit ST9 to one input of NAND gate NG2. Assuming that line voltage is present, the other input of NAND gate NG2 receives a high signal from inverter IN1 as hereinbefore described. As a result, NAND gate NG2 provides a high output to set closed position memory 6 and applies this high signal also to one input of NOR gate NOR7. Closed position memory 6 is similar to an R/S latch of the 4043 type but having additionally a $\overline{Q}$ output connected from the Q output through an inverter or the like. Upon being set, memory 6 provides a high signal from its Q output to the other input of NOR gate NOR7, thus providing a low signal from its output to one input of NAND gate NG16. Since NAND gate NG16 receives a high P2 pulse at its other input, it provides a high signal to one input of NAND gate NG18. NOR gate NOR15 receives high and low signals at its two inputs from NAND gate NG2 and the $\overline{Q}$ output of memory 6 to provide a low signal to one input of NAND gate NG17 which has a low also at its other input during the status pulse generator time period P2. As a result, NAND gate NG17 provides a high to the other input of NAND gate NG18. Since NAND gate NG18 now has high signals on both inputs it provides a low output which will keep transistor FET16 turned off, thereby to provide a high pulse during time period P2 as shown in FIG. 7d. Now, during the next 60 microsecond pulse P3 coming from the status pulse generator, one input of NAND gate NG16 will go low and one input of NAND gate NG17 will go high so that the output of NAND gate NG18 remains unchanged, thereby to provide the high pulse during period P3 as shown by curve 7d.

Returning now to the description of operation of status pulse generator 14 in FIGS. 4b, 4d, and 4e, it will be recalled that NOR gate NOR14 was operated to start positive timing pulse P2 and at the same instant time pulse P1 was terminated under the control of flip-flop DFF2. This status pulse generator basically operates as a 4022 type 4-stage Johnson counter except that it has been slightly modified to serve the present purpose of a 3-stage counter having outputs P1, P2 and P3 as will hereinafter become apparent. NOR gates NOR16 and NOR17 receive inputs from flip-flops DFF1 and DFF2 to develop a data signal for flip-flop DFF3. Now, when the third clock pulse is applied from oscillator OSC, flip-flop DFF3 will be set causing termination of output pulse P2 and starting of output pulse P3 from NOR gate NOR18. The Q output of flip-flop DFF3 supplies a data signal to flip-flop DFF4. When the fourth clock pulse is applied by oscillator OSC, flip-flop DFF4 is set causing termination of output pulse P3 and at the same time applying a low signal to one input of NOR gate NOR13. Since the other input of NOR gate NOR13 has been receiving a low signal from flip-flop DFF1, it provides a high signal for resetting flip-flop DFF1 in triggering circuit 16. Since all three outputs P1, P2, and P3 of the status pulse generator now are low, the aforementioned inputs thereof being high, information encoder 10 ungrounds the control line to provide a retriggering disable margin pulse P4 regardless of the state of the contacts or problem condition for the remainder of the 220 microsecond information request pulse IR as shown in FIG. 7.

Figure 5A:
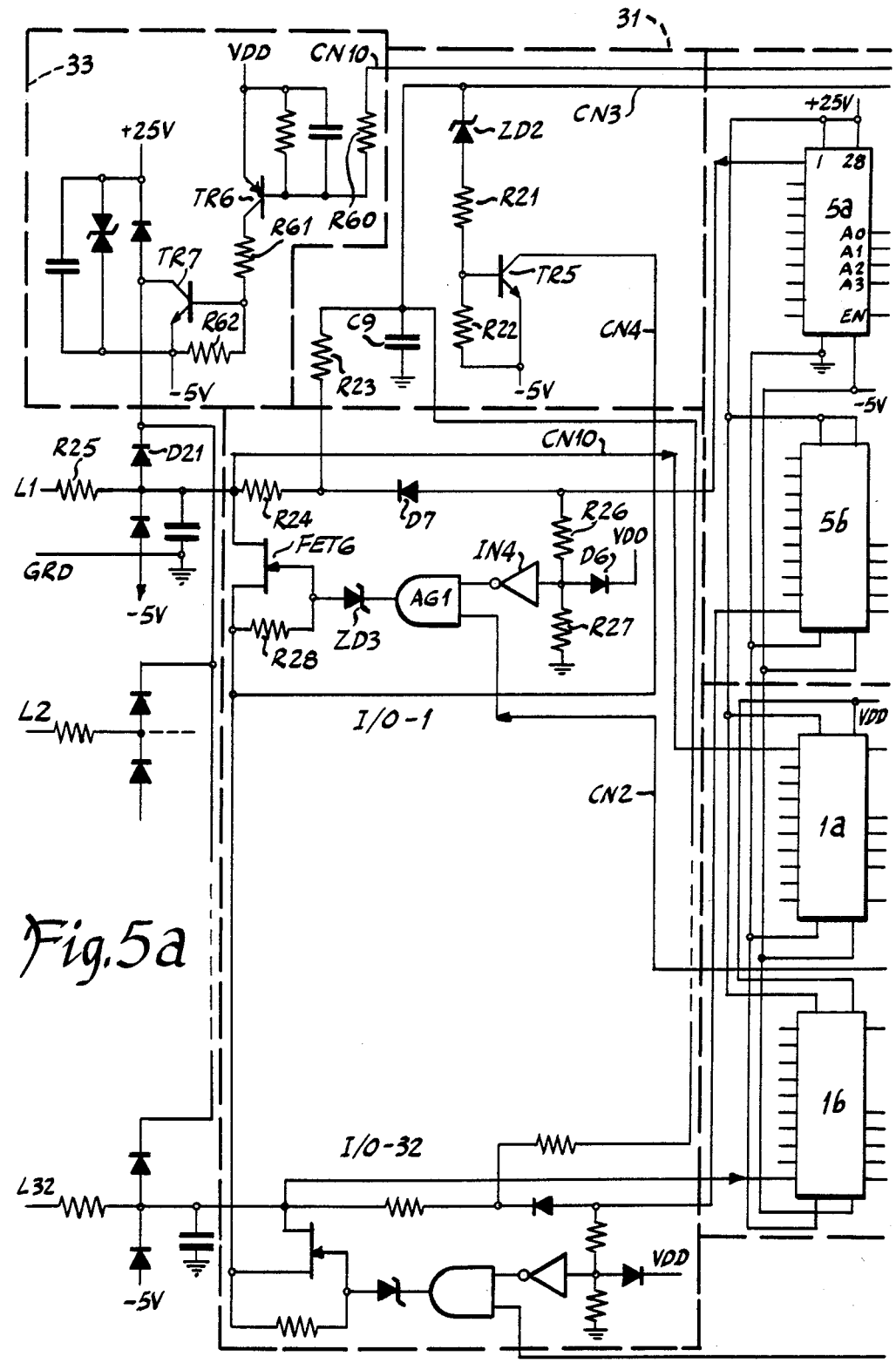
FIGS. 5a-c show a logic diagram of the I/O circuit shown in block diagram form in FIG. 2.
Figure 5B:
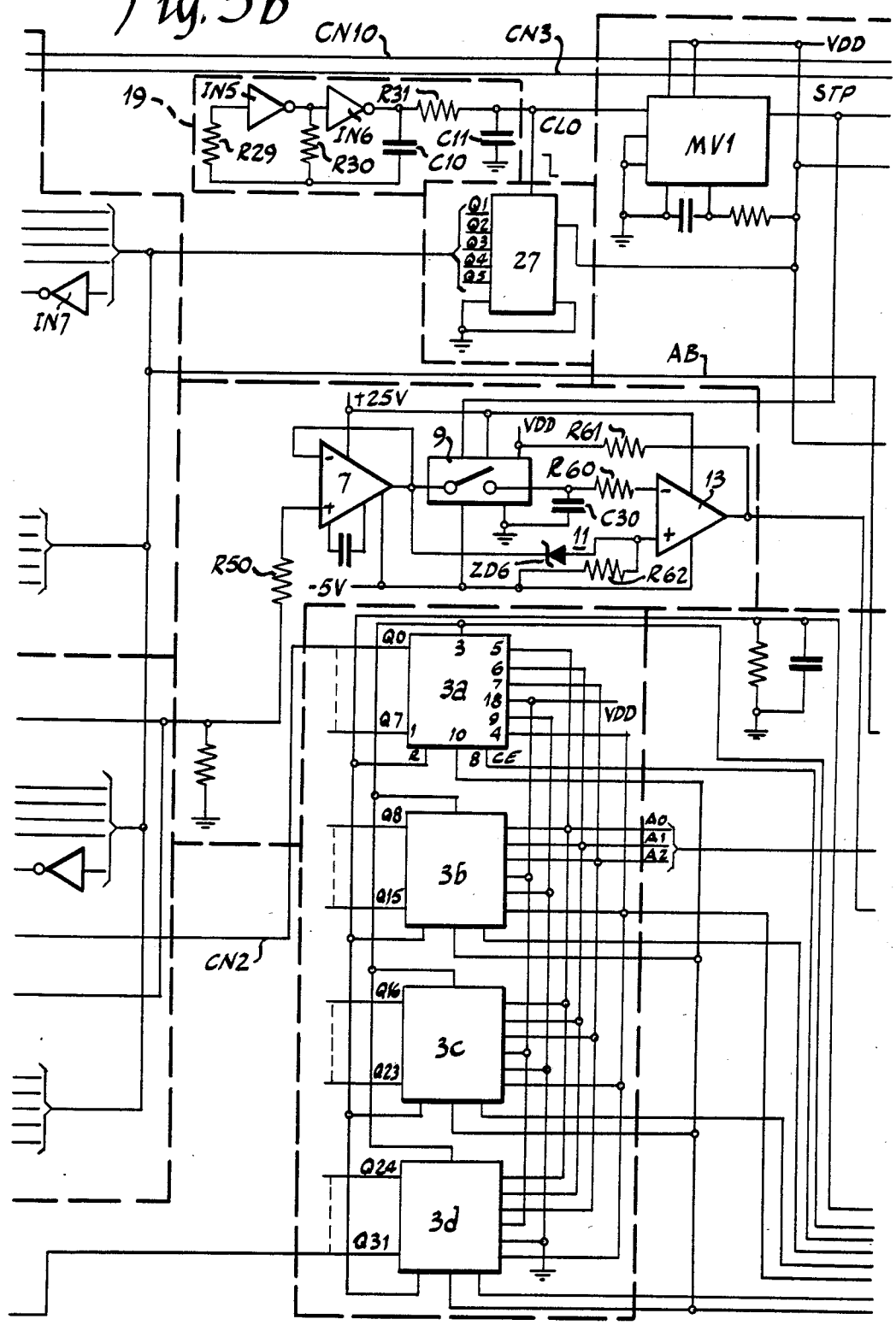
Figure 5C:
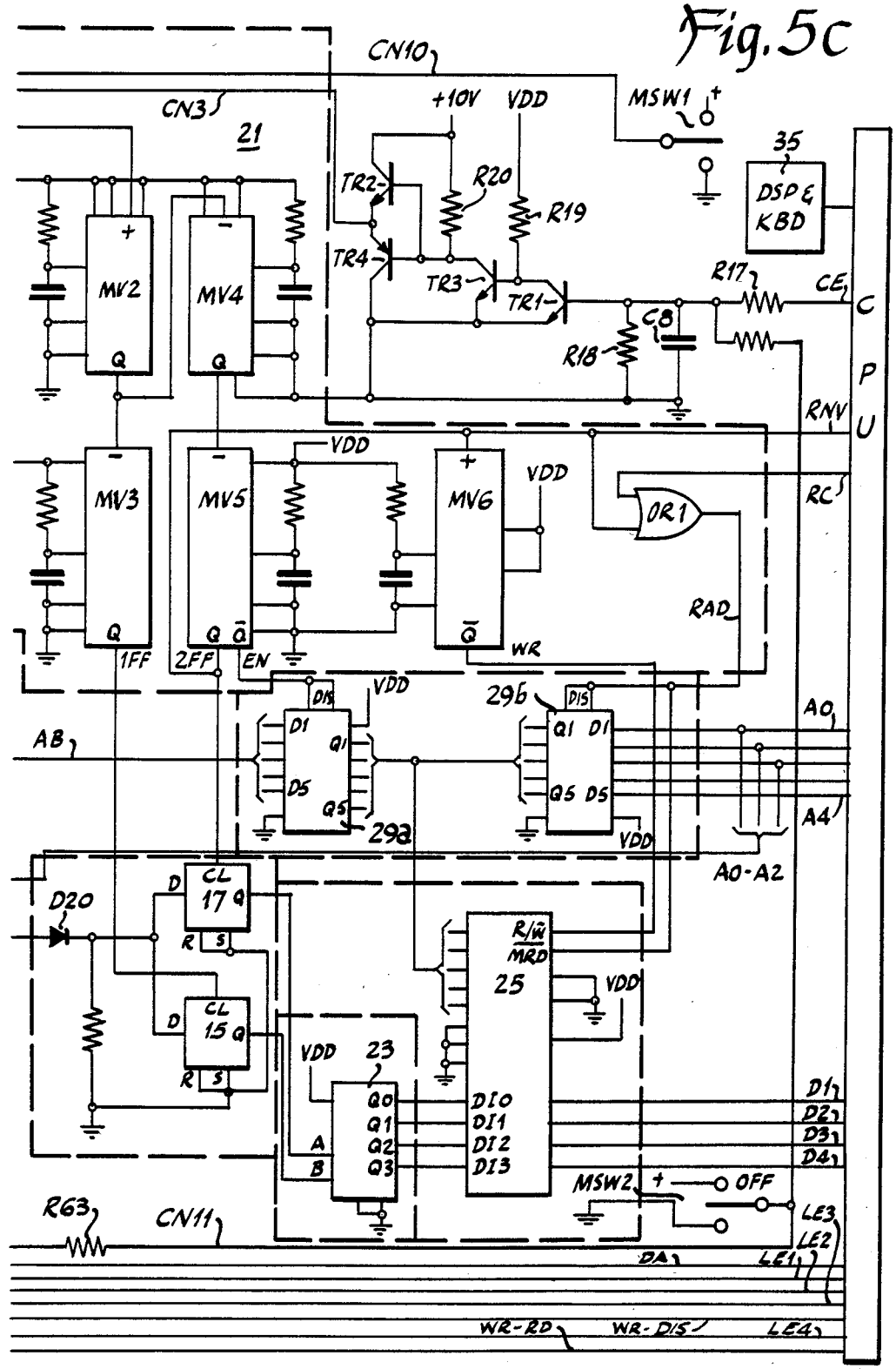
Figure 6:
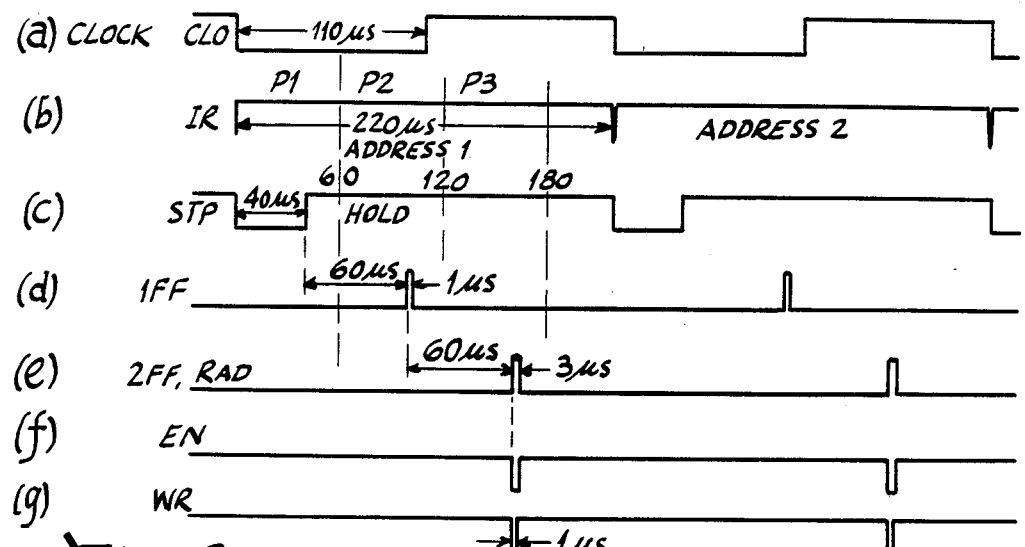
FIG. 6 is a timing chart showing operating characteristic curves of the I/O logic circuit of FIGS. 5a-c.

It will be recalled from the foregoing description in connection with FIG. 8 that the I/O circuit of FIGS. 5a-c sends an information request pulse IR every 7 milliseconds or the like over the control line. In order to prevent the status pulse generator from being retriggered into operation in the time intervals between the information request pulses, monostable multivibrator MSMV in FIG. 4e is used to disable trigger circuit 16 for 5-7 milliseconds or the like in the intervals between the IR pulses. For this purpose, monostable multivibrator MSMV is provided with a timing circuit comprising resistor R44 and capacitor C21 connected from supply voltage VDD to ground and from their junction through terminal T15 to timing terminal T of the multivibrator. Before this trigger circuit 16 was initially tripped by the IR pulse coming in on the control line, the $\overline{Q}$ output of the multivibrator was high so that the high IR pulse operated NAND gate NG15 and inverter IN16 to set flip-flop FF1. As a result, flip-flop FF1 tripped multivibrator MSMV and started it timing. As a result, its $\overline{Q}$ output went low for its time interval of 5 to 7 milliseconds to provide a low inhibit pulse P5 as indicated adjacent terminal T20 at the upper right hand portion of FIG. 4e and also in FIG. 7b. This inhibit pulse is applied to the upper input of NAND gate NG15 to prevent any transients on the control line from retriggering trigger circuit 16 during the time interval between information request pulses. This inhibit pulse may be set at a desirable length by the values selected for timing components R44 and C21. At the end of such time interval, monostable multivibrator MSMV times out and terminates the inhibit pulse to provide a high again at its $\overline{Q}$ output, thereby to restore the circuit for retriggering by the next information request pulse IR.

The manner in which information encoder 10 in FIGS. 4a and 4d transmits the contacts open code of FIG. 7 curve (e) will now be described. It will be recalled from the foregoing description, that the contact position sensor sensed a closed contact and set closed position memory 6. It will, therefore, be apparent that this memory must be reset in order to sense and encode an open contact indication. This is done in response to each open command coming along the control line. Command latch CL in FIG. 4c is reset in response to a +8 volt open command coming in on the control line. As a result, transistor FET7 is turned off to change the signal at Schmitt trigger circuit ST4 from low to high. This high is inverted in inverter IN22 to a low and applied to one input of NAND gate NG5. As a result, the output of NAND gate of NG5 goes high and is applied to reset close position memory 6.

It will be recalled that a high signal is applied to terminal T30 in FIG. 4a when an open contact is sensed. This high is applied through Schmitt trigger circuit ST9 to one input of NAND gate NG2, the other input of this NAND gate receiving a high from inverter IN1 when line voltage is present. As a result, lows are applied to both inputs of NOR gate NOR7 resulting in a high output therefrom to one input of NAND gate NG16, the other input of the latter receiving a high during pulse T2 from the status pulse generator. As a result, the output of NAND gate NG18 goes high which is applied through NOR gate NOR12 and inverter IN21 to turn on n-channel field effect transistor FET16 to ground the line as indicated in FIG. 7e for pulse time P2. At the start of pulse P3, termination of pulse P2 causes the output of NAND gate NG16 to go high which is applied to one input of NAND gate NG18. In the meantime, the other input of NAND gate NG18 has been receiving a high signal from NAND gate NG17 because a low is applied to one input thereof from NOR gate NOR15 which receives a high from the $\overline{Q}$ output of close position memory 6. Consequently, the output of NAND gate NG18 now switches low which is applied through NOR gate NOR12 and inverter IN21 to turn off transistor FET16 thereby providing a positive pulse during time period T3 as shown in FIG. 7e. Termination of pulse P3 has no effect on information encoder 10 so that the high pulse continues for the retriggering disable margin interval P4 as shown in FIG. 7e.

The manner in which the tripped code shown in FIG. 7 curve (f) is transmitted will now be described. It will be apparent that under this condition, an open contact high signal will come in on terminal T30 in FIG. 4a whereas close position memory 6 will remain set because an open command has not come in on the control line to reset the same as hereinbefore described. Therefore, high and low inputs are applied to NOR gate NOR7 providing a low output therefrom to one input of NAND gate NG16 which receives a high at its other input during pulse P2 from the status pulse generator. As a result, NAND gate NG16 provides a high to one input of NAND gate NG18. At the same time, lows are applied to the two inputs of NOR gate NOR15 resulting in a high output therefrom to one input of NAND gate NG17. A low pulse P3 at the other input causes a high output from NAND gate NG17 to the other input of NAND gate NG18. There being highs at both inputs of NAND gate NG18, a low is applied from the output thereof through NOR gate NOR12 and inverter IN21 to keep transistor FET16 turned off thereby to provide the high portion of the tripped code during time period P2 as shown in FIG. 7f. At the start of pulse P3, the termination of pulse P2 causes the output of NAND gate NG17 to switch to low which, when applied to one input of NAND gate NG18, causes the output of the latter to switch to a high, turning transistor FET16 on, thereby to provide a low level during time period P3 as shown in FIG. 7f. After the termination of pulse P3, the retriggering disable margin P4 is again generated in the same manner as hereinbefore described.

The manner in which the problem code shown in FIG. 7 curve (g) is generated will now be described. It will be recalled from the early description of the line absence sensor 8 at the upper portion of FIG. 4a that if line voltage appears on either power line LL1 and LL2, the output from NOR gate NOR1 to terminal T41 will be low. Therefore, if voltage does not appear on either side of the power line, the output of NOR gate NOR1 will be high and this high is applied from terminal T41 through resistor R12, terminal T9 and Schmitt trigger circuit ST1 to inputs of both NAND gates NG3 and NG4 in information encoder 10. This high will be combined with pulses P2 and P3 from the status pulse generator to provide a low at first one and then the other input of NAND gate NG19 causing its output to go high which is applied through NOR gate NOR12 and inverter IN21 to turn transistor FET16 on and ground the control line during time periods P2 and P3 as shown in FIG. 7 curve (g). Retriggering inhibit margin pulse P4 is then generated as hereinbefore described for the remainder of the 220 microsecond information request pulse IR as shown in FIGS. 7(a) and 7(g) provided the system power is on. If there is no system power at the remote breaker but power remains available at the I/O, the information request pulse IR will, of course, remain unmodulated and the code will be a continuous high for the entire 220 microsecond pulse time including portion P1 thereof. A problem code will again be detected at the I/O and by the action of the sample and hold circuit as hereinafter described.

Figure 11:
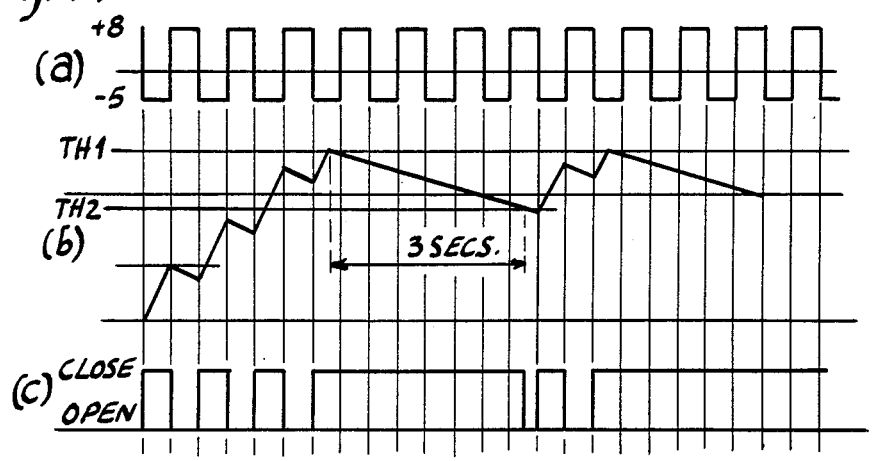
FIG. 11 is a chart showing operating characteristic curves of the rapid cycle inhibit circuit incorporated in the remote breaker electronic circuit of FIGS. 4a-e.

The manner in which the rapid cycle inhibit timer 30 at the upper portions of FIGS. 4b and 4c operates will now be described. The purpose of this inhibit circuit is to limit the number of times that operating commands can be rapidly applied to the breaker operating coils by transients on the control line or the like in order to prevent overheating and damaging the same. Normally, field effect transistor FET17 in FIG. 4c is turned on by positive voltage at its gate from the output of NAND gate NG20 because the upper input of the latter receives a low when a close command pulse is not present. This transistor FET17 acts through terminal T26 to pull the anode of diode D15 low. This low allows resistor R45 to discharge capacitor C22 in FIG. 4a which applies a low through terminal T35, Schmitt trigger circuit ST9 and inverter IN23 to provide a high at the lower input of NAND gate NG20. Now, each time that a close command pulse is applied as shown by curve (a) in FIG. 11 to close the contacts as shown by curve (c) in FIG. 11, a high is also applied from the output of NOR gate NOR4 to the upper input of NAND gate NG20 to cause the output of the latter to go low and turn off transistor FET17. As a result, capacitor C22 in coil pulse integrator circuit 36 charges from the line through diode D15 as shown by curve (b) in FIG. 11. Capacitor C22 also discharges through resistor R45 at alternate open commands or when no commands are applied but more slowly than it charges during close commands. Therefore, if the close command pulses are applied rapidly enough so that the charge on capacitor C22 reaches the threshold TH1 of Schmitt trigger circuit ST9 as shown by curve (b) in FIG. 11, it turns on field effect transistor FET18. As will be apparent, transistor FET18 grounds the command line CL at the input of Schmitt trigger circuit ST4, this being a simulated close command so that the breaker remains closed as shown by curve (c) in FIG. 11 and cannot be further cycled for a predetermined time interval of 3 seconds or the like. The high from the output of Schmitt trigger circuit ST9 is also applied through inverter IN23 to apply a low to the lower input of NAND gate NG20. This causes transistor FET17 to be turned on again to pull the anode of diode 15 low. Capacitor C22 then discharges through resistor R45 for about 3 seconds or the like as shown by curve (b) in FIG. 11. This 3 second period is considered long enough to allow the breaker coils to cool off whereafter the circuit can be restored for operation again. As will be apparent, at the end of this time interval, capacitor C22 has discharge below the threshold TH2 of Schmitt trigger circuit ST9 and transistor FET18 is turned off to terminate the close command.

If there is an overload condition on the power line, the circuit in FIGS. 4c and 4e will generate an open command. Normally, terminal T22 at the lower right hand portion of FIG. 4c has a low signal through line CN7 and pull-down resistor R46 to ground. In response to an overload, a current sensor CS will apply a high level to line CN7 and through terminal T22, Schmitt trigger circuit ST10 and inverter IN24 to one input of NAND gate NG21. This causes NAND gate NG21 to apply a high to set overload trip latch OLT of the set-dominated type. As a result, a high is applied from its Q output to NOR gate NOR5 which applies a low to NOR gate NOR3 resulting in a high open pulse on terminal T23 to energize the open coil OC and trip the breaker. As soon as this trip (open) condition is sensed, the high from the output of NOR gate NOR15 in FIG. 4a is applied through inverter IN25 to apply a low signal through conductor CN8 to the other input of NAND gate NG21 which previously received the overload signal at its first input. This maintains the set signal on overload trip latch OLT even after the overload sensor may have reset.

Exclusive OR gate EX2 and NOR gate NOR20 are provided to allow trip commands to be executed when the control line is commanding the device with a hold or close state. For this purpose, whenever a +8 volt open command signal or a −5 volt closed command signal appears on the control line resulting in a high on either input of exclusive OR gate EX2 but not on both, the output thereof will be high and will be applied to NOR gate NOR20. As a result, the low output of NOR gate NOR20 is applied to one input of NOR gate NOR2. The other input of NOR gate NOR2 receives a low signal from line CN1 of power-up circuit PU. The resulting high output from NOR gate NOR2 is applied to one input of NAND gate NG6 to allow it to pass command signals appearing at its other input.

On the other hand, if the control line is open, or the command voltage becomes approximately 0 volts or ground, the output of exclusive OR gate EX2 will go low resulting in a low being applied from NOR gate NOR2 to one input of NAND gate NG6 thereby to block passage of command signals therethrough. However, under overload current trip conditions, it is desirable to be able to apply an open command pulse regardless of the condition of the control line. Therefore, the Q output of overload trip latch OLT is also applied to the other input of NOR gate NOR20 to bypass the control from exclusive OR gate EX2. Thus, a high signal from the Q output of overload trip latch OLT causes a low output from NOR gate NOR20 and a high output from NOR gate NOR2 to one input of NAND gate NG6 to maintain the latter in condition for operation. This allows an open command pulse to be applied to terminal T23 of the desired controlled length to trip the device as hereinbefore described in connection with the open command.

Figure 3B:
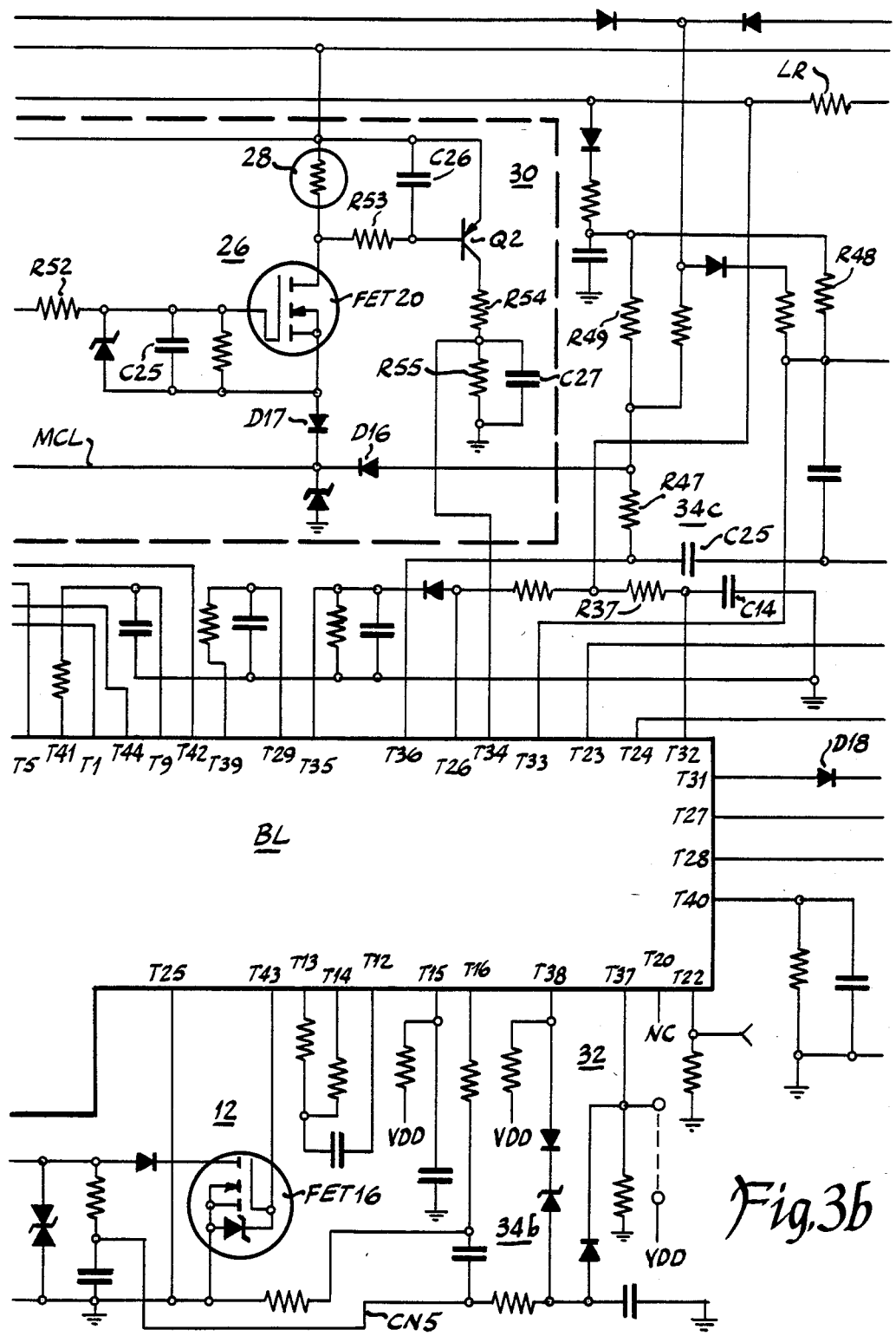
Figure 3C:
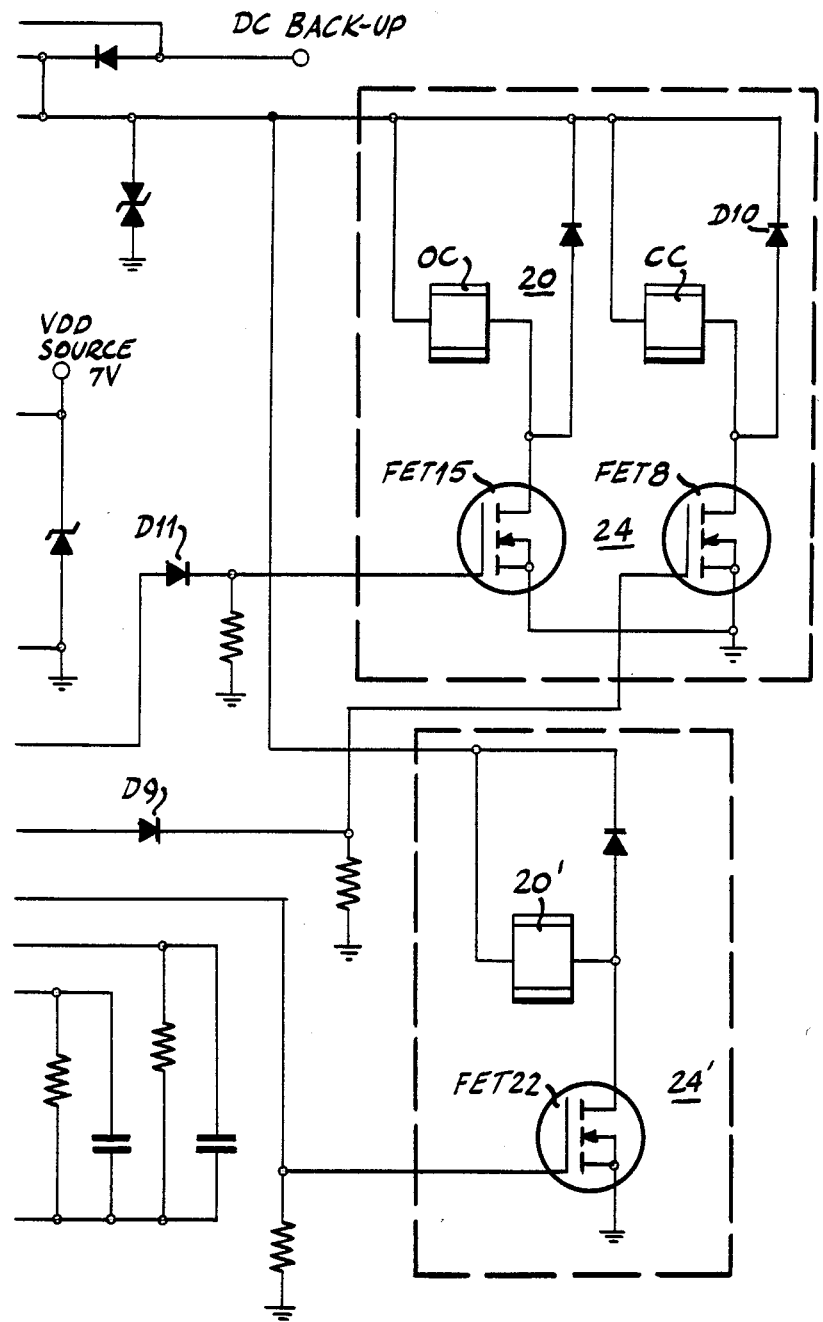

Referring to FIGS. 3a–b, there is shown an alternative means for controlling the remote breakers so as to turn them on or off manually. When this manual means is used in place of the automatic control means comprising the I/O system and central processing unit of FIGS. 5a–c, jumper J at the right hand portion of FIG. 4e must be connected to supply a high signal through terminal T37 to reset command latch CL so that it will not interfere with the manual control hereinafter described. The manual control comprises an indicator control unit I/CU shown in FIG. 3a. This indicator control unit is a conventional low current circuit breaker toggle switch which may be used to open and close the connection to ground thereby to transmit either a low signal or a high signal, and includes also an electro-thermal member which will respond to an increased current therethrough to trip the unit open and to indicate, by the position of its toggle lever, the tripped condition. When this indicator control unit is closed, it will send a low close command to cause the remote breaker to close and when it is opened, it will send a high open command to cause opening of the breaker. Such low close command is transmitted from ground therethrough and through manual control line MCL, diode D16, resistor R47 and terminal T36 to command line CL and Schmitt trigger circuit ST4 in FIG. 4c whereafter the close command will be applied in the same manner as hereinbefore described in connection with operation of transistor FET7 which applied a ground to this Schmitt trigger circuit ST4 using the computer command line L1 input. When this indicator control unit is opened, a high signal is applied from supply VDD in FIG. 3c through resistors R48, R49 and R47 and terminal T36 to Schmitt trigger circuit ST4 in FIG. 4c and from there on in the manner hereinbefore described.

Also, under manual control, if the contacts do not close or open when commanded, the "control signal repeat after transfer failure" circuit will operate every 2 seconds to generate another command pulse as hereinbefore described.

The system is provided with trip hold-off means which keeps the control line CL low delaying the opening of the contact before the indicator control unit I/CU switch has opened. Normally, as soon as a remote breaker trips on overload by a thermal or magnetic trip mechanism or the like, the current sensor CS at the lower right hand portion of FIG. 4e applies a signal to set overload trip latch OLT in FIG. 4c thereby to transmit an open command through NOR gate NOR5. However, in order to have accurate tripped status information, it is not desirable to reset closed position memory 6 before the indicator control unit switch I/CU has actually opened. The manner in which this reset is held off or delayed is as follows. When a tripped state of the breaker contacts is sensed, a high signal is applied from NOR gate NOR15 in FIG. 4a through line CN9 and inverted in inverter IN26 to apply a low trip command signal TC through terminal T42 as indicated adjacent thereto and then in FIG. 3a and 3b through resistor R50 to the base of transistor Q1 turning this transistor off. As a result, current flows from the power line through resistors R51 and R52 to charge capacitor C25 and to turn field effect transistor FET20 on. As a result, current flows from the power line through thermistor 28, field effect transistor 20, diode 17 and indicator control unit I/CU to heat the same to open it. The voltage drop across thermistor 28 turns transistor Q2 on, capacitor C26 and resistor R53 filtering any transients to prevent inadvertent turn-on of this transistor. Current flows from the power line through transistor Q2 and resistors R54 and R55 to ground, capacitor C27 suppressing transients, thereby to apply a high signal to terminal T34 and therethrough in FIG. 4c to turn field effect transistor FET21 on. This causes a low signal to be applied through transistor FET21 to command line CL and Schmitt trigger circuit ST4, thereby to delay resetting of closed position memory 6 until the I/CU actually opens. However, the open command from latch OLT nevertheless goes through NOR gate NOR5, causing the device contacts to open. After the indicator control unit I/CU has had time to heat sufficiently and pop open, the interruption of current through thermistor 28 decreases the voltage drop thereon to turn transistor Q2 off. As a result, a low signal is applied from ground through resistor R55 and terminal T34 and then in FIG. 4c to the gate of transistor FET21 to turn it off. This restores the high signal on the control line to cause closed position memory 6 to be reset. In this manner, this function has been delayed until the indicator control unit I/CU has actually opened. This is important to provide positive status information about the breaker contacts, even if the voltage on the control line to the indicator control unit becomes high because of the IR drop caused by a high current through the resistance of the indicator control unit and its control line.

Referring to FIG. 3c, it will be apparent that there is provided alternative means for operating a single coil remote breaker. This operating means comprises an operate coil 20' and a driver in the form of a field effect transistor FET 22 for operating this coil. Assuming that a breaker operate command of −5 volts comes over the control line in FIG. 4c, transistor FET7 will be turned on in a manner hereinbefore described to apply a low signal through Schmitt trigger circuit ST4 to NOR gate NOR5. As a result, a high from the output of NOR gate NOR5 is applied to turn transistor FET13 off thereby to start close coil timer CCT in FIG. 4e. During the nominal time period, a high is applied through terminal T28 and Schmitt trigger circuit ST9 to one input of NAND gate NG12 which operates NAND gate NG8 to turn transistors FET10a–c on thereby to discharge line voltage timer LVT. This causes a low signal to be applied for the duration of the capacitor C14 charging time through Schmitt trigger circuit ST6 to NOR gate NOR6. The consequent high signal from the output of NOR gate NOR6 is applied to one input of NAND gate NG6 whose other input has a high signal as hereinbefore described. As a result, the low signal from the output of NAND gate NG6 is inverted to a high in inverter IN26 and applied through terminal T31 and then in FIG. 3b through diode D18 to the gate of transistor FET22 to turn it on and energize the remote breaker operating coil 20'. This high signal for operating transistor FET22 is an operate pulse as indicated adjacent terminal T31 in FIG. 4c. This operate pulse is terminated by the line voltage timer LVT at the upper right hand portion of FIG. 4c. The way this is done is as follows. When capacitor C14 charges to the threshold value of Schmitt trigger circuit ST6, the previous low at the input of NOR gate NOR6 is switched to a high which acts through NAND gate NG6 and inverter IN26 to terminate the operate pulse.

The manner in which the state signals coming from the remote breaker electronic circuit in FIGS. 4a–c over the control line to the I/O circuit in FIGS. 5a–c are received and processed will now be described. It will be recalled from the foregoing description that the I/O circuit of FIGS. 5a–c transmitted an information request pulse IR shown in FIG. 8 over the control line periodically and that during such information request pulse the status codes shown in FIG. 7 were transmitted back to indicate the closed, open or tripped condition of the breaker contacts or a problem condition of the line. These status codes of FIG. 7 are received in FIG. 5a from control line L1 through resistor R25 and line CN10, status pulse multiplexer 1a and resistor R50 to a sample and hold circuit comprising buffer 7, analog switch 9, threshold circuit 11 and comparator 13. Since the information request pulses are transmitted to the 32 control lines in sequence and repeatedly, the status signals from the other 31 control lines come through status pulse multiplexers 1a and 1b in sequence and through resistor R50 to the same sample and hold circuit.

Figures 9, 10:
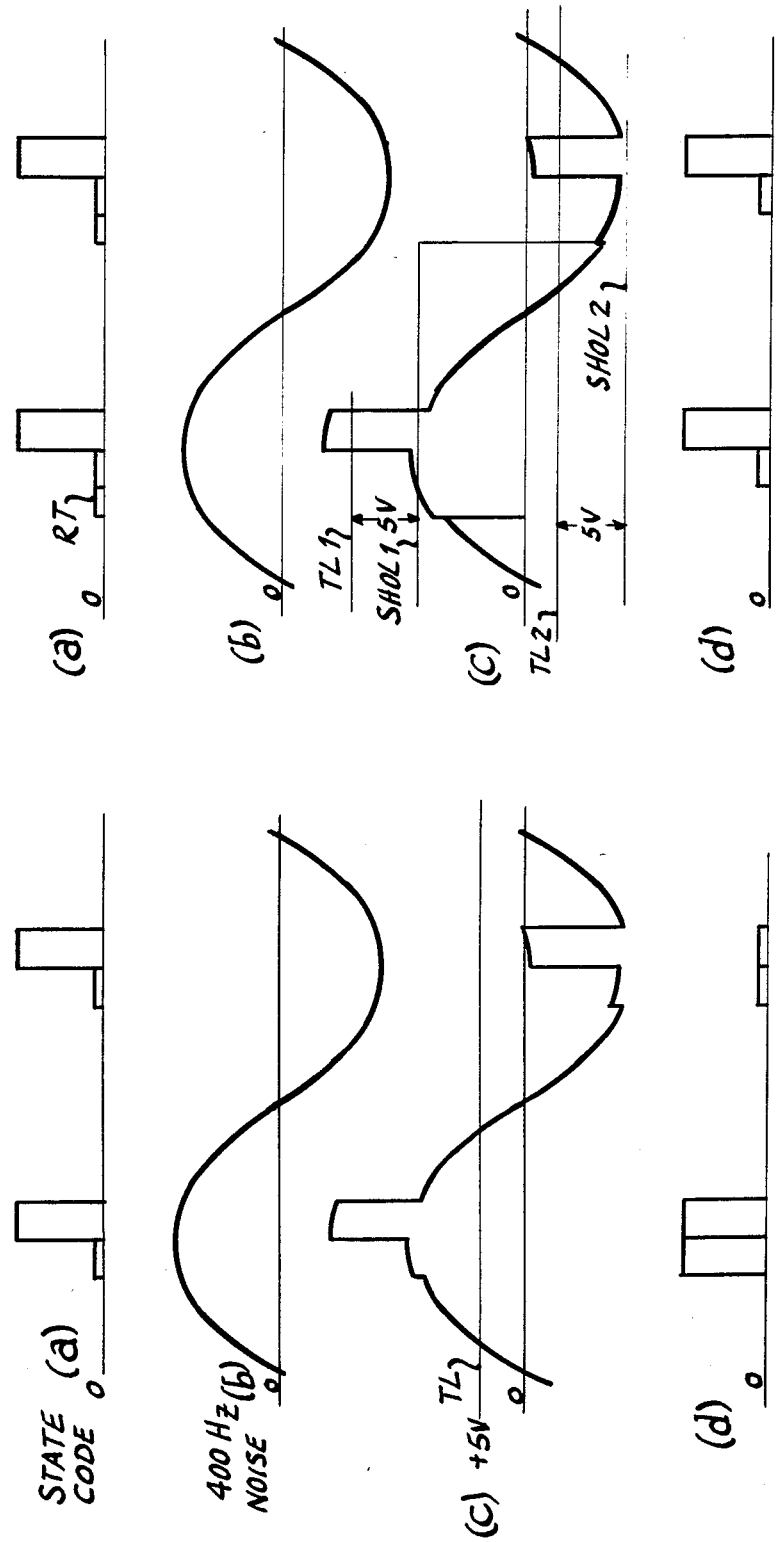
FIG. 9 is a chart showing characteristic curves for conventional level detection of information pulses.
FIG. 10 is a chart showing operating characteristic curves affording improved level detection and distinguishing information pulses from noise performed by the sample and hold circuit of FIGS. 5a-c.

The purpose of the sample and hold circuit is to distinguish the status codes from noise. In an aircraft, many of the power systems operate with 400 Hz AC power. The 400 Hz generator is the largest source of continuous noise in the plane. If this noise is induced into the control line, it is easy to filter it out from the control circuits but that is more complicated in the higher frequency information circuitry. FIG. 9 shows how noise can cause erroneous transmission of the state code. FIG. 9 curve (a) shows the two information pulses of the state code, FIG. 9 curve (b) shows the 400 Hz noise signal and FIG. 9 curve (c) shows the two superimposed. When the signal shown in FIG. 9 curve (c) enters a comparator with a fixed threshold, the comparator has to detect and determine which pulse is high and which is low. Assuming that the threshold level is at line TL in FIG. 9 curve (c), with the noise signal present, it is possible to get false information as shown in FIG. 9 curve (d) even with relatively low amplitude noise signals.

FIG. 10 shows how the sample and hold circuit of FIG. 5b prevents the transmission of false information even if noise is present. When the information pulses are of higher frequency than the disturbance noise, the circuit hereinafter described can detect the information even from high amplitude noise. FIG. 10 curve (a) shows the information pulses along with the initial reference time pulse RT also shown in FIG. 7, whereas FIG. 10 curve (b) shows a noise signal. FIG. 10 curve (c) shows the reference and information pulses and the noise signal superimposed on one another. During the positive half cycle of the noise signal in FIG. 10, if the signal combined with the noise is measured to provide a sample and hold output level SHOL1 and the threshold level TL1 is set 5 volts thereabove, it will be apparent that a correct transmission of the information pulses as shown at the left hand portion of FIG. 10 curve (d) will take place. Also as shown in FIG. 10 curve (c), if the signal combined with the noise during the negative half cycle of the noise signal is measured to provide a sample and hold output level SHOL2 and the threshold level TL2 is set 5 volts or the like thereabove, the information pulses can be clearly distinguished as shown by the right hand portion of FIG. 10 curve (d). The measuring of the signal combined with the noise is done by the sample and hold circuit of FIG. 5(b) which samples the noise level and holds that level during the following information pulses. The information pulses are compared to a threshold level, not related to 0 voltage but related to the noise level detected by the sample and hold circuit during the reference time. Since the noise frequency is lower than the frequency of the information pulses, the noise level will not change much in amplitude after the sampling of the noise level during the detection of the following information pulses. This insures that the information will be correct even though the noise amplitude is high.

FIG. 6 shows operating characteristics of the circuit in FIGS. 5b–c. As shown in FIG. 6 curve (a), oscillator 19 at the upper portion of FIG. 5 curve (b) provides clock pulses CLO having a length of 110 microseconds and 110 microseconds apart to define the length of the information request pulses IR generated by binary counter 27 and having a 220 microsecond period as shown in FIG. 6 curve (b). These clock pulses CLO are also applied to monostable multivibrator MV1 at the upper portion of FIG. 5b which provides a 40 microsecond sample time pulse STP as shown in FIG. 6 curve (c) that causes analog switch 9 to close for that sample period of time. During the initial reference time of the information request pulse, this closure of the analog switch allows the noise signal to come therethrough from buffer 7 and to charge capacitor C30 to the level of the noise. As shown in FIG. 10 curve (c), this sample and hold output level SHOL1 is applied from capacitor C30 through resistor R60 to the inverting input of comparator 13. Since "high" signal data pulses are required for status latch flip-flops 15 and 17 in FIG. 5c, it will be apparent that the non-inverting input of comparator 13 in FIG. 5b requires a positive signal not only higher than the noise signal being applied to the inverting input, but sufficiently higher to overcome threshold device 11 which is a 5 volt zener diode ZD6 or the like. This 5 volt threshold level TL1 is shown in FIG. 10 curve (c). While an approximately 5 volt threshold level TL1 has been used, it will become apparent that this threshold level may be set at any desired value depending upon the magnitude of the high pulse portions of the information codes. For illustrative purposes, FIG. 10 shows the transmission of an "open" information code having a low pulse and a high pulse according to FIG. 7 curve (e). As shown in FIG. 10, since the first pulse of the open information code is a low pulse below threshold level TL1, a low pulse will be correctly transmitted through the noise as shown in FIG. 10 curve (d). This low pulse will be transmitted from the output of comparator 13 in FIG. 5b to data latch flip-flops 15 and 17 in FIG. 5c. Referring again to FIG. 10, it will be seen that the second pulse of the open code is a high pulse having a magnitude above threshold level TL1 which causes the output of comparator 13 in FIG. 5b to go high and transmits a correct information pulse as shown in FIG. 10 curve (d). The output of comparator 13 is connected through resistor R61 to the supply voltage VDD of 7 volts DC or the like to control the level of the high portions of the information codes. Resistor R62 connects the non-inverting input of comparator 13 to −5 volts to keep the output of the comparator low except when a high information pulse is received at this non-inverting input.

The sample and hold circuit operates also during the negative portion of the noise signal shown in FIG. 10 to correctly transmit the information code pulses. During the sample time pulse period of FIG. 6 curve (c), capacitor C30 in FIG. 5b will be charged to the sample and hold output level SHOL2 shown in FIG. 10 curve (c) and zener diode ZD6 provides threshold level TL2. Now, when the information code comes in from the control line; the first low pulse will not pass zener diode ZD6 so that the output of comparator 13 will remain low. The next information pulse is high and exceeds threshold level TL2 of zener diode ZD6 and is applied to the non-inverting input of comparator 13 to cause the output of the latter to go high during the pulse P3 period shown in FIG. curve (e).

The sample and hold circuit serves an additional and very important purpose in sensing problem conditions. It was established before that the remote device circuit when detecting a power loss at the power line terminals (LL1 and LL2) would generate a status code in periods P2 and P3 of two lows. This signal shown in FIG. 7 curve (g) is decoded by the I/O circuit as a problem state. It was also established that if the remote device circuit experienced a total power loss, or if its connection to the I/O circuit was broken, it would not be able to respond to the information request pulse IR, causing it to remain high throughout all time periods including P1. The sample and hold circuit serves in this case to detect this remote circuit power loss which can also be a severance of the conductor connecting the I/O circuit to the remote circuit, and identify it as a problem state with two lows in time periods P2 and P3. The way the signal is converted is as follows. In the case described, the problem state causes the P1 period to remain high, that is, at the same high level as P2 and P3 which is 25 volts or the like. The sample and hold capacitor C30 charges through this "noise" level during the sample time pulse STP produced by multivibrator MV1 and provides a threshold level akin to SHOL1 in FIG. curve (c) but during the next two information pulse periods P2 and P3, the level at the non-inverting input of comparator 13 remains below the level of its inverting input as provided by the output of the sample and hold circuit, resulting that two lows are produced at the comparator output.

The manner in which the aforementioned two information code pulses, that is, the low and high pulses of time periods P2 and P3, respectively, of FIG. 7 curve e are stored in memory 25 in FIG. 5c will now be described. The output pulse of multivibrator MV1 at the upper right hand portion of FIG. 5b which was used as the sample time pulse for the sample and hold circuit as hereinbefore described, is also applied to monostable multivibrators MV2 and MV3 in FIG. 5c to trigger a suitable delay and a suitable length of pulse 1FF, respectively, as a clock pulse for flip-flop 15. As shown in FIG. 6 curve (d), multivibrator MV2 provides a 60 microsecond delay following the termination of the sample time pulse STP and multivibrator MV3 provides a pulse length of 1 microsecond, following the termination of the pulse from MV2, for clock pulse 1FF. It will be apparent from FIG. 6 that this clock pulse 1FF is applied to flip-flop 15 at the same time as the first information pulse is being applied during time period P2 to the data input of flip-flop 15. This will cause the Q output of flip-flop 15 to be set low assuming that the open code shown in FIG. 7 curve 7(e) is being stored in the memory. In a similar manner, the end of the output pulse from multivibrator MV2 triggers multivibrator MV4 to provide a suitable delay of 60 microseconds which at the end of its output pulse triggers multivibrator MV5 to provide a suitable length pulse 2FF of 3 microseconds, for use as a clock pulse for flip-flop 17. As shown in FIG. 6 curve (e), clock pulse 2FF is applied to flip-flop 17 at the same time as the second information pulse is applied from comparator 13 through diode D20 to the data input D of flip-flop 17 during time period P3. As a result of the clock pulses and the data pulses just described, the Q outputs of flip-flops 15 and 17 are set to low and high signals, respectively, and these status latch flip-flop outputs are then applied in parallel to the two inputs of status decoder 23. This status decoder 23 which may be a 4555 binary to 1 of 4 decoder type decodes the P3-P2 binary inputs shown in FIG. 7 (g),(e),(f), and (d) to a single high output at output terminals Q0, Q1, Q2 or Q3, respectively. These four decoder outputs are applied to the four inputs DI0-3 of memory 25 which may be of the 1822 256×4 RAM type or the like.

In order to store the status of breaker number one in memory 25, it is necessary to provide it not only with the data but also with an address and a write pulse. At the same time as binary counter 27 has generated the address to select control on L1, this same address is also applied through address bus AB in FIG. 5b to address buffer 29a in FIG. 5c for the duration of the information request pulse IR shown in FIG. 6 curve (b). Address buffer 29a may be of the 4503 type or the like and is normally disabled by a high signal at its disable terminals DIS so that the address does not pass therethrough to memory 25. However, at the same time as the high clock pulse 2FF is applied from the Q output of multivibrator MV5, a low enable pulse EN shown in FIG. 6 curve (f) is applied from the $\overline{Q}$ output of this multivibrator to address buffer 29a, thereby to cause it to pass the address to memory 25. Also, at the same time, clock pulse 2FF is applied to monostable multivibrator MV6 to cause it to apply a one microsecond wide write pulse WR shown in FIG. 6 curve (g) to the read-write input R/W of memory 25. As a result, the status data from decoder 23 is stored in the address location in the memory which location corresponds to the address of the control line being interrogated. At the same time, clock pulse 2FF is applied from the output of multivibrator MV5 through OR gate OR1 to the disable input of address buffer 29b and to the read input $\overline{MRD}$ of memory 25 to prevent the central processing unit CPU from addressing and reading the memory at the same time as data is being stored therein. However, at other times central processing unit CPU may apply a low signal on read command line RC and through OR gate OR1 to enable address buffer 29b and memory read input $\overline{MRD}$ of memory 25 to allow reading of the data from the memory which will then pass through data bus D1-4 from the memory to the central processing unit for display on display 35. Also, during the time that data is being recorded in memory 25, clock pulse 2FF from multivibrator MV5 is applied through line RNV as a read not valid signal to indicate to the central processing unit that reading of the memory may not be performed during the time that data is being stored therein.

As hereinbefore described briefly in connection with FIG. 2, manual override circuit 33 in the upper left hand portion of FIG. 5a may be used to close all of the remote breakers. For this purpose, a low signal is applied from ground through manual switch MSW1 in a first position in FIG. 5c through line CN10 and resistor R60 to turn transistor TR6 on. As a result, current flows therethrough and through resistors R61 and R62 to turn transistors TR7 on. This causes −5 volts to be connected through transistor TR7, diode D21 and resistor R25 to line L1, thereby to turn all of the remote breakers on.

To turn all of the remote breakers off, control latches 3a–d in FIG. 5b must be reset. It will be apparent that while FIG. 2 shows a single manual switch MSW, for convenience, this switch actually has two poles MSW1 and MSW2 at the upper and lower right hand portions of FIG. 5c. When this switch is operated to its other position, a positive signal is applied from part MSW2 thereof through line CN11 and resistor R63 to the reset inputs R of control latches 3a–d to reset the same. The resultant low signals from these control latches will be applied through lines such as line CN2 to keep transistors FET6 off, thereby to apply high signals to the control lines as hereinbefore described to turn all of the remote breakers off.

While the apparatus hereinbefore described is effectively adapted to fulfill the objects stated, it is to be understood that the invention is not intended to be confined to the particular preferred embodiment of remote control circuit breaker system with on-off-tripped-problem status storage and indication disclosed, inasmuch as it is susceptible of various modifications without departing from the scope of the appended claims.

We claim:

1. A remote control circuit breaker system comprising:

a plurality of remote control circuit breakers, each having contacts for controlling connection of power from an electric power supply source over a power line to a respective load;

an electronic control unit for each said circuit breaker;

a local I/O circuit arranged to communicate with said plurality of remote control circuit breakers' electronic control units;

control lines comprising conductor pair connections between said I/O circuit and respective ones of said remote breaker's electronic control units over which said communication is conducted;

a central processing unit arranged to communicate with said I/O circuit so as to transmit close and open commands for said breakers thereto and to read therefrom status data that is stored therein;

means in said I/O circuit for transmitting said close and open commands over said control lines to the respective electronic control units;

four-state sensing means in each said electronic control unit for sensing the closed, open or tripped status of the associated breaker contacts and a problem status of said power line or said control line and means for generating data respectively indicative thereof;

means including said sensing means in each said electronic control unit for applying a close or open operate signal to the respective breaker in response to said commands whenever the command coming over the corresponding control line differs from the sensed closed or open status of the respective breaker contacts;

means in said I/O circuit for periodically transmitting status information request pulses over said control lines to the respective electronic control units in sequence;

means in each said electronic control unit responsive to the respective information request pulse for tripping its data generating means into operation and to transmit said four-state status indicative data back to said I/O circuit;

and means in said I/O circuit for receiving and storing said four-state status indicative data so as to make it available for reading by said central processing unit.

2. The remote control circuit breaker system claimed in claim 1, wherein:

said central processing unit is arranged for tri-state communication with said I/O circuit so as to transmit hold command signals for said breakers thereto in addition to said close and open commands;

means in said I/O circuit for receiving a hold command signal from said central processing unit and applying said hold command signals to all said electronic control units;

and means in each said electronic control unit responsive to the respective hold command signal for keeping the respective breaker in its current state until said hold command signal is removed.

3. The remote control circuit breaker system claimed in claim 1, wherein:

said four-state sensing means and said data generating means comprise:

means for performing a high frequency resistance measurement of single-break contacts and for providing error free first data if said contacts are open or second data if said contacts are closed regardless of configuration or self generation characteristics of load.

4. The remote control circuit breaker system claimed in claim 3, wherein:

said four-state sensing means and said data generating means comprise:

a closed position memory;

means for setting said memory responsive to sensing closed contacts and for resetting said memory in response to said open command;

and means responsive to sensing open contacts while said closed position memory is in its set state for providing third data indicative of a contacts tripped open state.

5. The remote control circuit breaker system claimed in claim 1, wherein:

said four-state sensing means and said data generating means comprise;

means for performing a voltage measurement of double-break contacts and for providing error free first data if said contacts are open or second data if said contacts are closed regardless of configuration or self generation characteristics of load.

6. The remote control circuit breaker system claimed in claim 5, wherein:

said four-state sensing means and said data generating means comprise:

a closed position memory;

means for setting said memory responsive to sensing closed contacts and for resetting said memory in response to said open commands;

and means responsive to sensing open contacts while said closed position memory is in its set state for providing third data indicative of a contacts tripped open state.

7. The remote control circuit breaker system claimed in claim 4, wherein:
said four-state sensing means and said data generating means comprises:
means responsive to sensing of no power line voltage on said breaker contacts for providing fourth data indicative of said problem status.

8. The remote control circuit breaker system claimed in claim 4, wherein:
said data generating means comprises:
means responsive to an open or shorted condition of said control line for providing said fourth data indicative of said problem state.

9. The remote control circuit breaker system claimed in claim 1, wherein:
said means in each said electronic control unit for applying a close or open signal comprises:
rapid cycle inhibit means responsive to alternate application of said close and open signals above a predetermined rapid cyclic frequency due to electrical noise on the control line or other cause for stopping and inhibiting the same for a predetermined time interval long enough to prevent overheating damage to said breakers.

10. The remote control circuit breaker system claimed in claim 1, wherein:
said means in said I/O circuit for receiving and storing said four-state status indicative data comprises:
sample and hold means comprising:
means for measuring the electrical noise level coming in on the control line during a predetermined first portion of said information request pulse and providing a noise level signal proportional thereto;
threshold means for comparing said status indicative data with said noise level signal and for transmitting status indicative data that differs from said noise level signal by a predetermined amount thereby effectively to distinguish said data from said noise level signal;
and means for storing said data.

11. The remote control circuit breaker system claimed in claim 1, wherein:
each said electronic control unit comprises means for selectively setting the same for alternative manual control and status indication of the breaker contacts;
a manual indicator-control unit for each said breaker operable to control the corresponding electronic control unit to apply said close or open signal to said breaker;
and means in said electronic control unit responsive to tripping of said breaker for transmitting a trip command to said manual indicator-control unit to set it in an indicator state to visually indicate the tripped condition of the breaker.

12. The remote control circuit breaker system claimed in claim 1, wherein:
said means including said sensing means in each said electronic control unit for applying a close or open operate signal to the respective breaker in response to said commands whenever the command coming over the corresponding control line differs from the sensed closed or open status of the respective breaker contacts comprises:
a breaker energization control timer;
means responsive to said command for triggering said timer to time the length of said operate signal sufficient to insure operation of the breaker;
and means responsive to said sensing means sensing that the breaker contact state agrees with the command for terminating said operate signal.

13. The remote control circuit breaker system claimed in claim 12, wherein:
said breaker energization control timer comprises:
means for timing the length of said breaker operate signal as an inverse function of the magnitude of the line voltage so as to apply the breaker operate closed or open longer when the line voltage is low than when it is high thereby to insure change of state of the breaker.

14. The remote control circuit breaker system claimed in claim 1, wherein:
said means including said sensing means in each said electronic control unit for applying a close or open operate signal to the respective breaker in response to said commands whenever the command coming over the corresponding control line differs from the sensed closed or open status of the respective breaker contacts also comprises:
means for terminating said operate signal after a predetermined time interval long enough to insure transfer of the breaker contacts in most cases;
a time-delay responsive repeat circuit for causing reapplication of said operate signal a predetermined time interval after initiation of operation thereof;
and means responsive to failure of said sensed closed or open contact status to agree with said command for said predetermined time interval for initiating and maintaining operation of said time-delay responsive repeat circuit to cause said reapplication of said operate signal.

15. The remote control circuit breaker system claimed in claim 12, wherein:
said means including said sensing means in each said electronic control unit for applying a close or open operate signal to the respective breaker in response to said commands whenever the command coming over the corresponding control line differs from the sensed closed or open status of the respective breaker contacts also comprises:
a time-delay responsive repeat circuit for measuring a predetermined time interval;
and means responsive to failure of said sensed closed or open contact status to agree with said command for said predetermined time interval for operating said time delay responsive repeat circuit;
and means responsive to said repeat circuit at the end of said predetermined time interval for triggering said energization control timer to apply and time the length of another corresponding operate signal.

16. The remote control circuit breaker system claimed in claim 1, wherein:
said remote control circuit breaker system also comprises:
means for sensing an overload current condition on said power line for providing an overload signal;
and means responsive to said overload signal for applying said open operate signal to the respective breaker.

17. The remote control circuit breaker system claimed in claim 16, wherein:
said means including said sensing means in each said electronic control unit for applying a close or open operate signal to the respective breaker in response to said commands comprises:

a time-delay responsive repeat circuit for causing reapplication of said operate signal a time interval after initiation of operation thereof;

and means responsive to mismatch of said sensed contact status with said overload caused open operate signal for said time interval for operating said repeat circuit to cause said reapplication of said open operate signal.

18. The remote control circuit breaker system claimed in claim 1, wherein:

said means in said I/O circuit for transmitting said close and open commands over said control lines to the respective electronic control units comprises:

means using tri-state communication so as to transmit said commands as positive and negative voltages so that a shorted or grounded fault will not cause an error in breaker state.

19. The remote control circuit breaker system claimed in claim 11, wherein:

said electronic control unit comprises:

means responsive to receipt of a command from said manual indicator control unit for applying said close or open operate signal to the respective breaker;

means for terminating said operate signal after a time interval long enough to insure transfer of the breaker contacts in most cases;

and a timed delay repeat circuit responsive to failure of said sensed closed or open contact status to agree with said command for causing reapplication of said operate signal.

20. The remote control circuit breaker system claimed in claim 19, wherein:

said electronic control unit further comprises:

means responsive to said sensing means and said command transmitting means when the sensed closed or open contact state matches said command for terminating said operate signal to the respective breaker before the end of said time interval.

21. The remote control circuit breaker system claimed in claim 11, wherein:

said electronic control unit further comprises:

means for tripping said breaker in response to overload;

means for sensing an overload current condition on said power line for providing an overload signal;

and means responsive to said overload signal for applying said open signal to the breaker;

means normally responsive to said open signal for changing said tripped status to open status indication;

means responsive to said sensing means sensing a tripped status for transmitting a trip command to said manual indicator-control unit to trip the same open;

and hold-off means responsive to said trip command for delaying said changing of status indication until said manual indicator control unit has actually tripped open.

22. A remote control circuit breaker system comprising:

a plurality of remote control circuit breakers, each having power switching means for controlling connection of power from an electric power supply source over a power line to a respective load and tripping means responsive to overload;

an electronic control unit for each said circuit breaker;

a local circuit arranged to communicate with said plurality of remote control circuit breakers' electronic control units;

control lines comprising conductor pair connections between said local circuit and respective ones of said electronic control units over which two-way communication is conducted;

means in said local circuit for transmitting close and open commands over said control lines to the respective electronic control units;

means in each said electronic control unit coupled to the respective breaker power switching means for sensing their open, closed or tripped state and means for generating serial status codes respectively indicative thereof;

means in each said electronic control unit responsive to said close and open commands for applying corresponding close and open operate signals to the respective remote control circuit breakers;

and means in said local circuit for causing said electronic control units to transmit said status codes to it and for storing the same.

23. The remote control circuit breaker system claimed in claim 20, wherein:

said power switching means is a single break switch;

and said sensing means comprises means for sensing the resistance of said single-break switch.

24. The remote control circuit breaker system claimed in claim 20, wherein:

said power switching means is a double-break switch;

and said sensing means comprises means for sensing voltage at said double-break switch.

25. The remote control circuit breaker system claimed in claim 21, wherein:

said electric power supply source is a D.C. source.

26. The remote control circuit breaker system claimed in claim 22, wherein:

said electric power supply source is an A.C. source.

27. A remote control load switching system comprising:

a plurality of remote control switching devices, each having power switching means for controlling connection of power from an electric power supply source over a power line to a respective load;

an electronic control unit for each said switching device;

a local circuit arranged to communicate with said plurality of remote control switching devices' electronic control units;

control lines comprising conductor pair connections between said local circuit and respective ones of said electronic control units over which two-way communication is conducted;

means in said local circuit for transmitting tri-state close, open and hold command signals over said control lines to the respective electronic control units;

means in each said electronic control unit coupled to the respective device's power switching means for sensing their open or closed state and means for generating serial status codes respectively indicative thereof;

means in each said electronic control unit responsive to said close and open command signals for applying corresponding close and open operate signals to the respective remote control switching devices;

and means in said local circuit for causing said electronic control units to transmit said serial status codes to it and for parallel storing the same.

28. A remote control load switching system comprising:

a plurality of remote control switching devices, each comprising power switching means for controlling connection of power from an electric power supply source over a power line to a respective load;

a local circuit arranged to communicate with said plurality of remote control switching devices;

control lines comprising conductor pair connections between said local circuit and respective ones of said remote control switching devices over which two-way communication is conducted;

means in said local circuit for transmitting continuous close, open or hold command signals over said control lines to the respective remote control switching devices;

means for sensing the open or closed state of said power switching means of the respective switching devices in sequence and means for generating status codes respectively indicative thereof;

means responsive to said close and open command signals for applying corresponding close and open operate signals to the respective remote control switching devices whenever a closed or open command signal differs from said sensed closed or open state;

and means for interrupting said command signals to store said status codes.

29. A remote control load switching system comprising:

a plurality of remote control switching devices, each comprising power switching means for controlling connection of power from an electric power supply source over a power line to a respective load;

a local circuit arranged to communicate with said plurality of remote control switching devices;

control lines comprising conductor pair connections between said local circuit and respective ones of said remote control switching devices over which two-way communication is conducted;

means for transmitting continuous close and open command signals over said control lines to the respective remote control switching devices;

means for sensing the open, closed and tripping status of said power switching means of said remote control switching devices and a problem status of said system and means for generating status codes respectively indicative thereof;

means responsive to said close and open command signals for applying corresponding close and open operate signals to the respective remote control switching devices if a closed or open command signal differs from said sensed closed or open or tripped state;

and means for interrupting said command signals for storing said status codes.

30. The remote control load switching system claimed in claim 29, wherein said means for transmitting close and open command signals over said control lines to the respective remote control switching devices comprises:

a plurality of command latches, one for each of said control lines;

a central processing unit for setting said command latches to selective close and open command states whereby their outputs provide corresponding continuous close and open command signals;

and means for transmitting said continuous close and open command signals over said control lines to the respective remote control switching devices.

31. The remote control load switching system claimed in claim 30, wherein said means for interrupting said command signals for storing said status code comprises:

a memory;

means for multiplexing said control lines for predetermined time intervals long enough to receive said status codes and to store them in corresponding multiplexed locations in said memory.

means responsive to said multiplexing of said control lines for interrupting the respective command signals for said time intervals;

a display;

and means in said central processing unit for reading the status of selected remote control switching devices and displaying the same on said display.

* * * * *